US008700096B2

(12) United States Patent
Little et al.

(10) Patent No.: US 8,700,096 B2
(45) Date of Patent: *Apr. 15, 2014

(54) ADVANCED SYSTEM AND METHOD FOR DYNAMICALLY DISCOVERING, PROVISIONING AND ACCESSING HOST SERVICES ON WIRELESS DATA COMMUNICATION DEVICES

(75) Inventors: Herbert A. Little, Waterloo (CA); Craig A. Dunk, Guelph (CA); Hugh Hind, Waterloo (CA); Gary P. Mousseau, Waterloo (CA); Barry J. Gilhuly, Waterloo (CA)

(73) Assignee: BlackBerry Limited, Waterloo (CA)

( * ) Notice: Subject to any disclaimer, the term of this patent is extended or adjusted under 35 U.S.C. 154(b) by 438 days.

This patent is subject to a terminal disclaimer.

(21) Appl. No.: 12/561,859

(22) Filed: Sep. 17, 2009

(65) Prior Publication Data
US 2010/0003972 A1 Jan. 7, 2010

Related U.S. Application Data

(63) Continuation of application No. 10/474,174, filed as application No. PCT/CA02/00515 on Apr. 12, 2002, now Pat. No. 7,610,045.

(60) Provisional application No. 60/283,315, filed on Apr. 12, 2001.

(51) Int. Cl.
*H04M 3/00* (2006.01)
*H04W 4/00* (2009.01)
*H04M 1/00* (2006.01)

(52) U.S. Cl.
USPC ......... 455/566; 455/418; 455/420; 455/435.1

(58) Field of Classification Search
USPC ................ 715/237, 705, 717, 738, 744–745; 726/28; 705/14, 26, 14.4, 14.49, 14.51, 705/14.55–14.56, 14.64; 455/422.1, 414.2, 455/456.2, 3.01, 41.2, 414.1–414.3, 455/418–420, 435.1, 456.5–456.6, 457, 455/466, 550.1, 556.2, 557, 566; 709/203, 709/218–219, 228–229, 244; 717/173, 717/176–178
See application file for complete search history.

(56) References Cited

U.S. PATENT DOCUMENTS 5,742,668 A 4/1998 Pepe et al.
6,078,924 A * 6/2000 Ainsbury et al. ............. 707/101
(Continued)

FOREIGN PATENT DOCUMENTS

EP 1021021 7/2000
WO 97/08906 A1 3/1997
(Continued)

OTHER PUBLICATIONS

"UDDI Technical White Paper", Sep. 6, 2000, from uddi.org.
(Continued)

*Primary Examiner* — Meless Zewdu
(74) *Attorney, Agent, or Firm* — Jones Day

(57) ABSTRACT

A system and method for pushing a service book to a mobile device is provided. A service book includes a plurality of fields relating to a host service. At least one mobile device is identified that is to receive the service book. Wireless propagation information is provided that identifies an address for the mobile device to receive the service book. The service book is transmitted over a wireless network using the address for the mobile device, and is received by the mobile device.

19 Claims, 14 Drawing Sheets

(56) References Cited

U.S. PATENT DOCUMENTS

| | | | |
|---|---|---|---|
| 6,167,253 A * | 12/2000 | Farris et al. ............... 455/412.2 |
| 6,205,330 B1 | 3/2001 | Winbladh |
| 6,223,291 B1 * | 4/2001 | Puhl et al. ...................... 726/28 |
| 6,604,140 B1 * | 8/2003 | Beck et al. .................... 709/226 |
| 6,813,501 B2 | 11/2004 | Kinnunen et al. |
| 7,610,045 B2 * | 10/2009 | Little et al. ................... 455/418 |
| 2001/0012281 A1 * | 8/2001 | Hall et al. .................... 370/338 |
| 2001/0034846 A1 * | 10/2001 | Beery ........................... 713/201 |
| 2001/0037241 A1 * | 11/2001 | Puri ................................ 705/14 |
| 2002/0035605 A1 | 3/2002 | McDowell et al. |
| 2002/0049049 A1 * | 4/2002 | Sandahl et al. ............... 455/414 |
| 2002/0082912 A1 | 6/2002 | Batachia et al. |
| 2002/0143819 A1 * | 10/2002 | Han et al. ..................... 707/513 |
| 2002/0187779 A1 * | 12/2002 | Freeny, Jr. .................... 455/422 |
| 2003/0033209 A1 * | 2/2003 | Minear et al. .................. 705/26 |
| 2003/0065805 A1 * | 4/2003 | Barnes, Jr. .................... 709/231 |
| 2009/0327825 A1 * | 12/2009 | Natsuno et al. ............... 714/748 |
| 2010/0076871 A1 * | 3/2010 | Lloyd et al. .................... 705/27 |
| 2010/0095293 A1 * | 4/2010 | O'Neill et al. ................ 717/173 |

FOREIGN PATENT DOCUMENTS

| | | |
|---|---|---|
| WO | 97/32439 | 9/1997 |
| WO | 97/32439 A3 | 9/1997 |
| WO | 97/41654 | 11/1997 |
| WO | 99/39286 A1 | 8/1999 |
| WO | 00/69140 A1 | 11/2000 |
| WO | 01/45343 A2 | 6/2001 |

OTHER PUBLICATIONS

EPO: Extended European Search Report for Application 10162598.6-1525 dated Jun. 18, 2010 (7 pages).

EPO: Communication pursuant to Article 94(3) EPC for Application 10162598.6-1525 dated May 27, 2011 (6 pages).

EPO: Extended European Search Report for European Patent Application No. 10186214.2-1525 dated Feb. 15, 2011 (6 pages).

Chavez et al: "Interactive Applications of Personal Situation-Aware Assistants" Elsevier, IMC '98, Computers & Graphics 23 (1999), pp. 903-915.

EPO: Communication pursuant to Article 94(3) EPC from European Patent Application No. 10186214.2-1525 dated Aug. 16, 2011 (5 pages).

Li et al.: "Supporting Personal Mobility for Nomadic Computing Over the Internet," Department of Electrical Engineering, The University of British Columbia, Vancouver, B.C., Canada, Apr. 1997, XP-000720423 (10 pages).

EPO: Communication pursuant to Article 94(3) EPC for Application 10 162 598.6-1525 dated Jun. 5, 2012 (5 pages).

* cited by examiner

ADVANCED SYSTEM AND METHOD FOR DYNAMICALLY DISCOVERING, PROVISIONING AND ACCESSING HOST SERVICES ON WIRELESS DATA COMMUNICATION DEVICES

CROSS-REFERENCE TO RELATED APPLICATION

This is a continuation of U.S. patent application Ser. No. 10/474,174, now U.S. Pat. No. 7,610,045, filed on Oct. 2, 2003, which is a national phase entry under 35 USC 371 of PCT application PCT/CA02/00515 filed Apr. 12, 2002, which claims priority from and is related to the following prior application: Advanced System and Method for Dynamically Enabling Host Services on Wireless Data Communication Devices, U.S. Provisional Application No. 60/283,315, filed Apr. 12, 2001. These prior applications, including the entire written description and drawing figures, are hereby incorporated into the present application by reference.

FIELD OF THE INVENTION

The present invention is directed toward an advanced method of discovering, provisioning and accessing host services on one or more wireless data communication devices. When a user of a wireless mobile device ("mobile device") wants to expand the usefulness of their investment, they add services and features to the device. The problem of discovering an available wireless service is just one of several problems faced by the user of a mobile device. Once discovered, the user also has to be provisioned to use the service and finally the provisioned application must contact the host that is providing the service itself. The present invention provides a loosely coupled system so that mobile devices can be dynamically added or removed from a host service with relative ease.

BACKGROUND OF THE INVENTION

In the area of land-line solutions and the use of the Internet, the most common solution for solving the discovery and integration of new services is through Universal Description, Discovery and Integration (UDDI). UDDI provides a browser and Application Program Interface (API) centric view of dealing with dynamic services. The browser method treats potential service users as always online. The API method also assumes always online and continuous high speeds for program to program communication. The UDDI method of host service registration is described by the following documents found on the www.uddi.org Internet web site: Version 2.0 Programmer's API Specification, Version 2.0 Data Structure Specification, Version 2.0 Replication Specification Version 2.0 Operator's Specification, Executive White Paper (version 1.0), Technical White Paper (version 1.0), Using WSDL in a UDDI Registry 1.05, Using WSCL in a UDDI Registry (1.02) and Providing a Taxonomy for Use in UDDI Version 2.

FIG. 1 describes a simplified view of the relationships depicted and expected in the UDDI specifications. In UDDI the business user 2 is the center of attention as they justify the presence of the service by paying for the service. Business users 2 are motivated to use and find services to solve real-world business problems. Business users 2 use marketplace web sites 4 and search portals 6 to find required web services. The UDDI service cloud 8 acts as a worldwide repository of service information 10 that is accessible in a distributed manner through a network like the Internet. Behind the service cloud are actually databases 10, perhaps using LDAP services or some other fast look-up technology to satisfy service requests. These databases 10 might be distributed around the globe and may communicate using a UDDI propagation technique as defined in the UDDI specification. Populating these databases 10 are technical users 14 that write software that includes UDDI protocols and practices 12. These programs register their service information in the large service registry system. This triangle relationship just described is the bases of the majority of the UDDI specification.

UDDI and other similar types of service registry definitions all define a central store where all services can be found if desired. The UDDI specifications describe ways to manipulate, change and replicate this information between databases in the UDDI cloud. Additionally the services are categorized into Taxonomies to further help with locating and identifying the service needed.

FIG. 2 is an illustration of the relationships between a service offering 16, a service listing 20 and a service user 18 in a UDDI environment. This three-way relationship has its advantages for landline environments, but needs modification and extending for wireless environments. Essentially, a company, person or organization decides they want to create a public or semi-public service that should be made available to a wide audience of users. The service creator 16, or the eventually service provider 16, propagates the service information to a central registry of public services 20. In addition, a third party may develop the software, and each time it is purchased and installed a new service registry entry is created. Alternatively, a single company may created the service and also offer it to the public. Another possibility is that several companies may build a service and each run a similar version of the service.

Within the service registry 20 further propagation takes place so that the service information is distributed throughout the entire system of service registries 10. Essentially the act of publishing the service information once, allows for a "publish once access anywhere" design approach. This publishing can be done programmatically or through manual processes through the UDDI API definitions. Part of UDDI is a rich set of XML, and SOAP-based commands that allow service providers to securely establish, modify and delete entries in the registry database 20.

The service listing 20 provides a source of new services for service users 18. Service users are typically web browser users, but could also be programs looking for services. This helps to support web crawlers that are building service listings and search portal information. Users typically start up web browsers to search for service information and perform searches until the information is found. This model is based on a request/response model, or a pull architecture. This design is important because it is the only way for the user to access web-based service registries in landline environments. The service information exchanged follows a ridge format that is also shown in FIG. 2.

The overall service information 22 has been labeled service book 30 for ease of reference. The use of UDDI to define the form of a service book 30 is present only for illustration. UDDI is well known and is currently defined as a note in the W3C. However, there are many other formats, definitions and proprietary methods to define a service book 30 that would have a similar functionality. The service book in the UDDI XML schema represents four main XML core types of information. These four information types include business information 22, service information 24, binding information 26 and service specific information 28. These information sections are build in hierarchies and are sub-sections of the layer above it. These types of information groups provide different levels of functionality. The business information section 22 allows top-level searching for company names and company sectors: these are often called 'white pages'. Different taxonomies are provided to find companies that service a specific industry or who are located in a given region of the country; these are often called 'yellow pages'. Further within the business information section 22 are sub-sections for defining service information 24, binding information 26 and detailed service information 28: these are often called 'green pages'. Service information 24 includes a grouping to define common services for further categorization. Binding information 26 includes routing information to find the service, either through URI (URL) type references or some other proprietary numbering method. The detailed service information 28 includes capabilities of the service and define elements like security level, data formats, database types, specific data access schemas and many other possible data exchange requirements. There are many other components of the UDDI XML schema but for this description these sections indicate a possible definition for a service book 30 entity.

SUMMARY

A system and method for pushing a service book to a mobile device is provided. A service book includes a plurality of fields relating to a host service. At least one mobile device is identified that is to receive the service book. Wireless propagation information is provided that identifies an address for the mobile device to receive the service book. The service book is transmitted over a wireless network using the address for the mobile device, and is received by the mobile device.

DETAILED DESCRIPTION

1. System Overview of Service Discovery and Access

Figure 1:
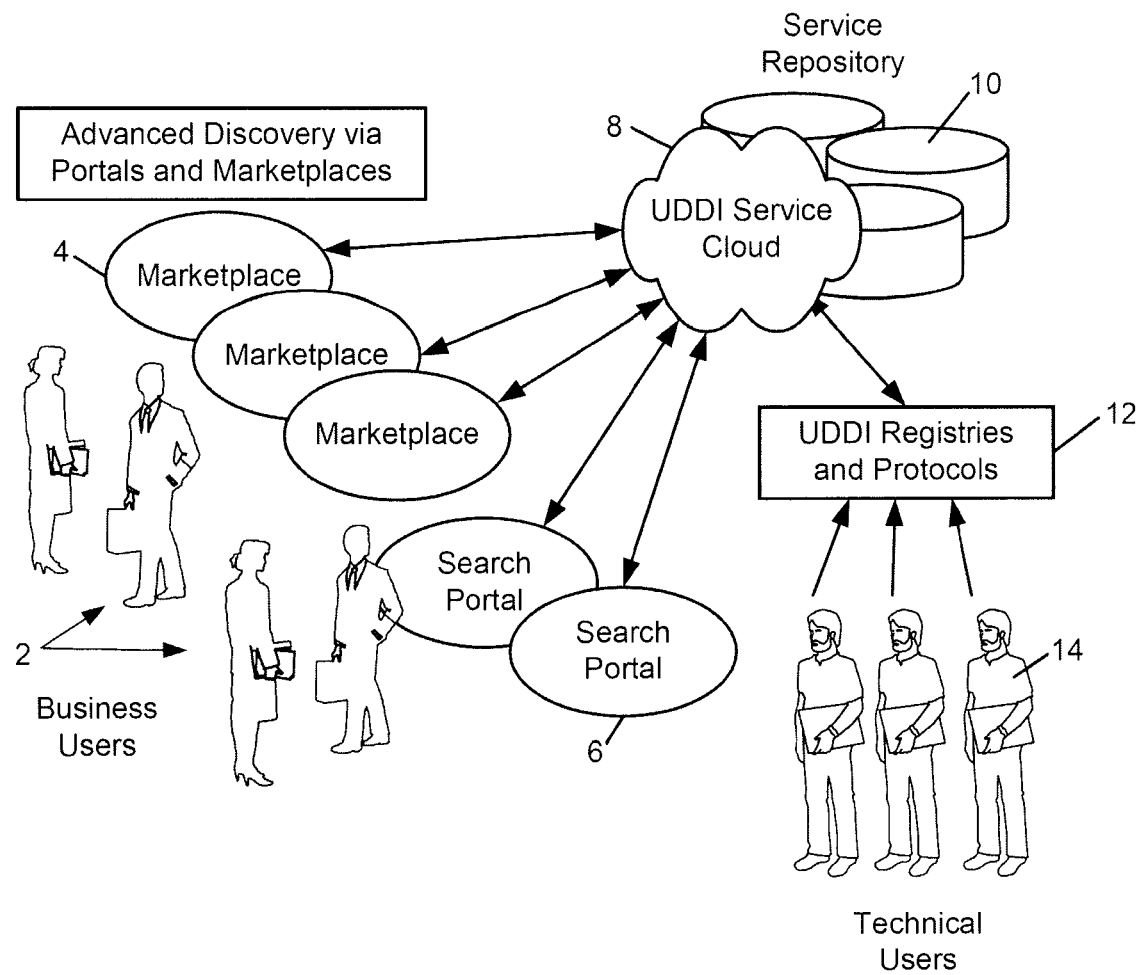
FIG. 1 describes a simplified view of the relationships depicted and expected in the UDDI specifications.
Figure 2:
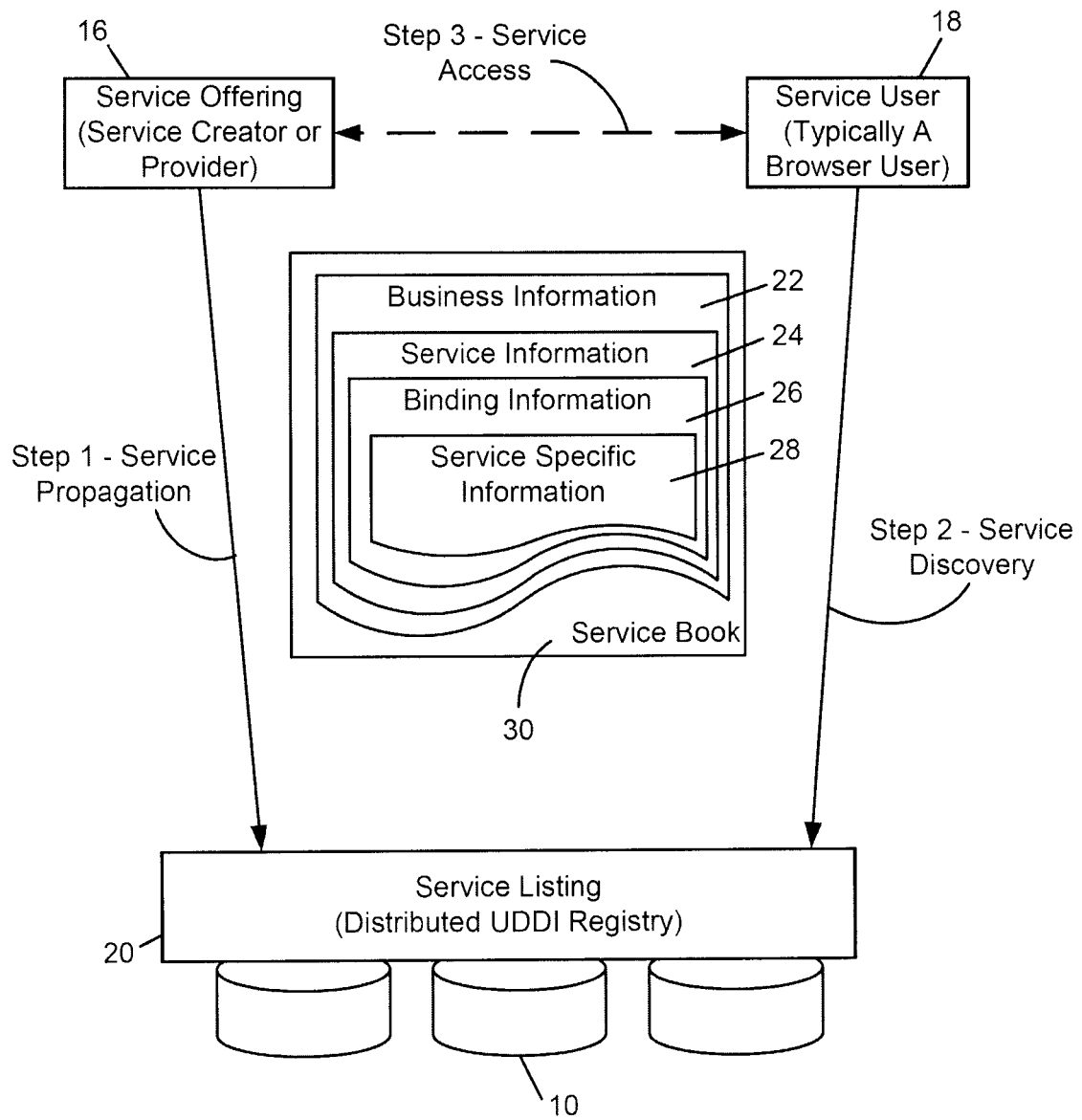
FIG. 2 is an illustration of the relationships between the service offering, the service listing and the service user.
Figure 3:
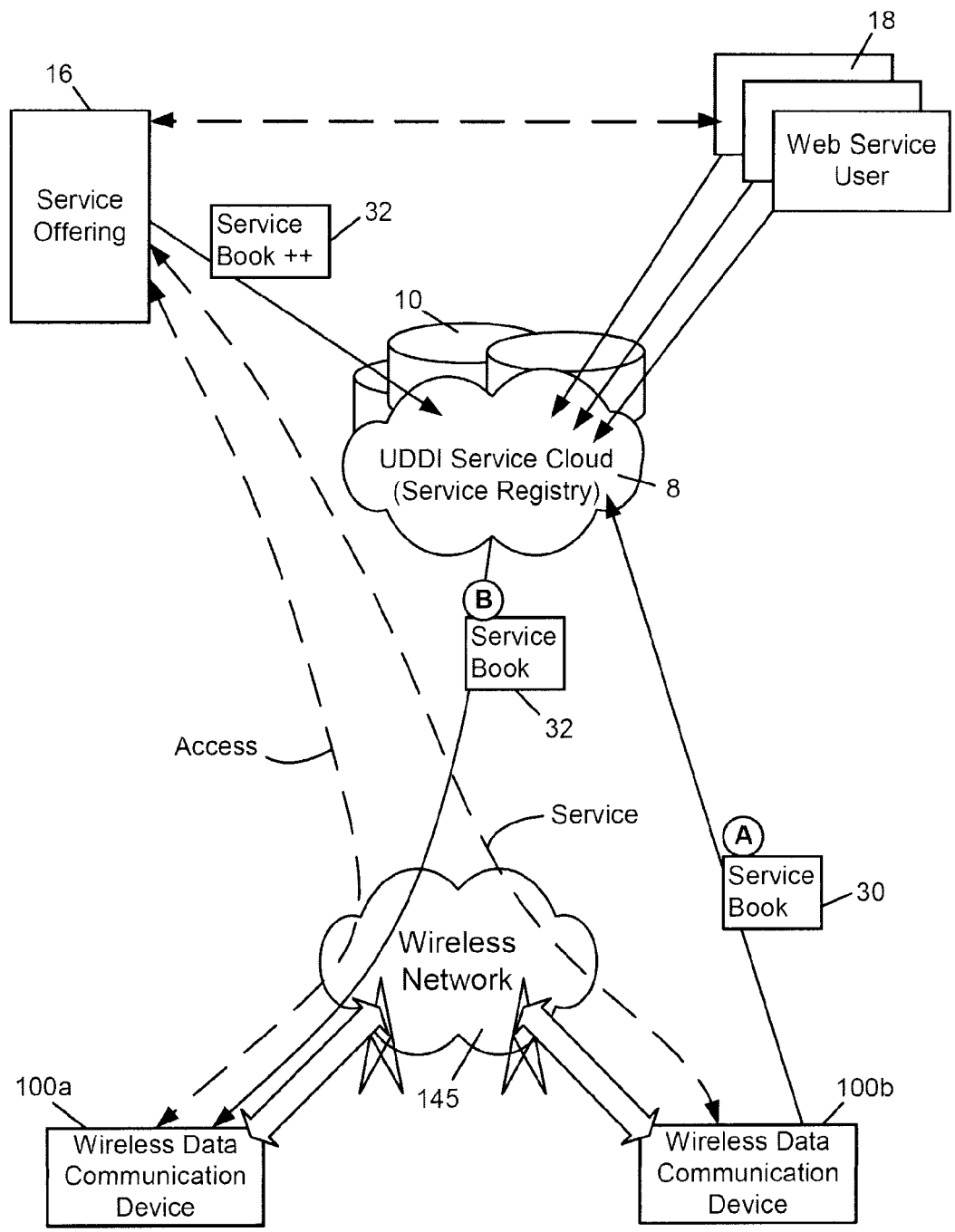
FIG. 3 illustrates two methods for discovering host services and then accessing those services.
Figure 4:
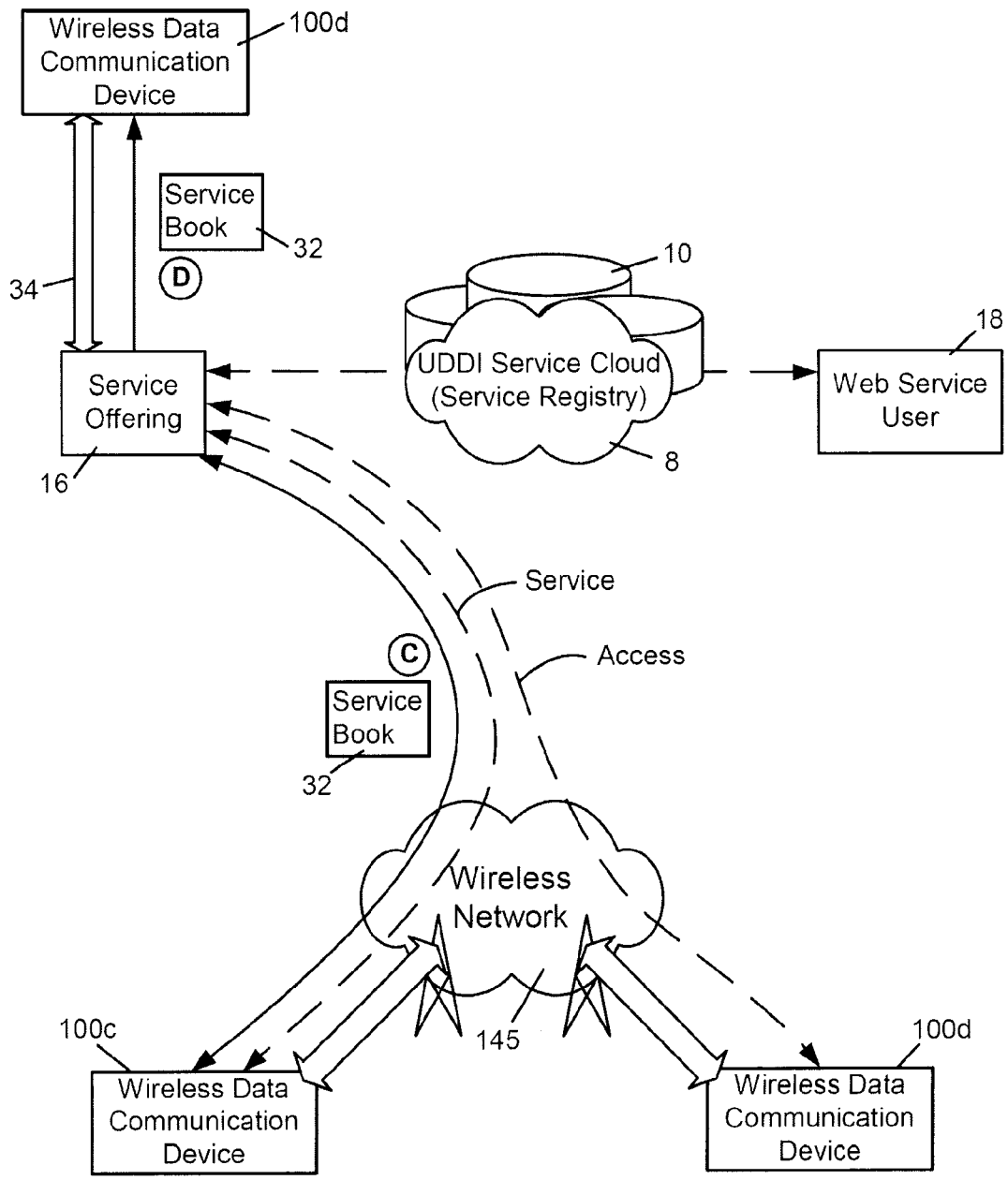
FIG. 4 illustrates two additional methods for discovering host services beyond those shown in the prior art.

FIGS. 3 and 4 illustrate exemplary methods for discovering service offerings 16 (for example web services) and then accessing those services using a wireless data communication device 100. FIG. 3 also illustrates that a UDDI method for accessing the service registry is also supported from a mobile device 100b, but is problematic. The exemplary methods illustrated in FIGS. 3 and 4 each utilize a service book 30, 32, which may, for example, include the following fields:

(1) Business Elements: Company Name, Address and other Company Information;

(2) Service Elements: Name of Service, Purpose of Service, Cost and Billing Issues, Service Identifier String (Application Link);

(3) Routing Information: Service Book identifier, Routing information of service, Id of service and other identification information;

(4) Detailed Service Information: Service features (compression, encryption, packaging), type of packaging, types of mobile devices supported (i.e. form factor, screen sizes, etc), content type of data exchanged (MIME, HTML, XML, Java, Proprietary, etc), (5) Wireless Information: destination device identifier 1, device type, delivery method for sending service book, destination device identifier 'N';

(6) Provisioning Information: provisioning required flag, type of provisioning, URL or address of provisioning site, MIME type of downloadable item.

Wireless Information is applicable when the Service Registry is being asked to forward the information to additional locations. Many of these items will be described in greater detail in the figures to follow. The service identifier string for example is used on the mobile device 100 to assist applications to locate the correct service book information for provisioning purposes. (Part of Extended Service Book 32)

Provisioning Information is applicable for advanced service book operations, especially when application downloading is required. The routing information of service (URL) may be used after the application is downloaded to the user's mobile device. (Part of extended service book 32)

Turning now to FIG. 3 there are two paths labeled (A) and (B). The path labeled (A) illustrates that it is possible to utilize a UDDI method to emulate the behavior of a traditional landline web browser with a wireless browser. The information retrieved can be presented using a format like WML (wireless markup language) so that the user can view the business information before deciding what to do. This UDDI method, however typically requires wireless speeds that make finding the correct service slow and time consuming on a mobile device 100b. In addition, when a user is in poor or marginal coverage areas, the mobile device 100b is typically unable to search for services. Without having a cache of services on the mobile device 100b this would mean that access to services may also be impossible when coverage is not available.

FIG. 3 also illustrates a new method for populating the service book, labeled (B), where the UDDI service cloud 8 receives a service book entry 32 and pushes the extended service book entry 32 to the mobile device 100a. Note: the extended service book 32 might have the wireless section removed, since it is only used by the UDDI service registry to push service books 32 to mobile device. Note: the service book might also have no provisioning section, so it could become an originally defined UDDI service book 30. This could be mistaken for simply extending the UDDI service cloud 8 to include mobile devices 100, but this is not the case. In fact if that were tried the memory and processing power on the mobile device 100 would typically make the system unusable. To get around this problem of simply extending the UDDI service cloud 8 the invention uses a method of sending only targeted and addressed service books 32 to one or more mobile devices 100. Using this targeted method the service book listing on the mobile device 100 is a manageable size and the user has greater control of what services are kept and which are ignored. Otherwise if hundreds or thousands of service books were being sent to the mobile device 100 the user would never be able to keep up with the vast number of updates, and the device's memory and battery would be insufficient for the job.

To emphasize this targeted approach, example (B) in FIG. 3 shows the UDDI service registry 8 being given a service book 32 with additional information (++). The plus, plus (++) will be described later but includes advanced wireless propagation information not currently defined in the UDDI specification. In this situation the service provider 16 is aware that the type of service being offered is wireless ready. This can mean several things, it could mean that the service is designed specifically with mobile devices in mind, or it might also mean that the service can be presented so that wireless browsers and landline browsers can both access the service. It is not necessary that a web service support only web browsers, but also Java-based program could be used to interface with the host service. When using this feature the service provider 16 would also have to add mobile device routing information for this advanced propagation. The addition of this information to the UDDI XML schema would indicate to the UDDI registry that the information is to be pushed to the listed wireless addresses.

Within a service book 32, would be an additional section known as the "Wireless Information" section that described the addresses of mobile devices that should receive the pushed service book 32. This address list could either be IPv4 addresses, IPv6 address, proprietary network addresses, or some Personal Information Number (PIN) of the mobile device, as described below in greater detail. The full extension would have many elements within the Wireless Information part of the XML schema for a UDDI service book exchange, or some other elements in other proprietary or non-proprietary formats that might be used. Some of the elements would be (a) binding key value which identifies the instance of the wireless information structure, (b) one or more service key values which identifies one or more mobile devices, (c) access point value an optional value that could be present as a gateway address for reaching the mobile, and (d) access method which defines whether TCP/IP, UDP/IP or some other proprietary method like IPv6 over TCP/IPv4 or e-mail should be used to send the service book. The address of the mobile device 100*a* could be a proprietary network address, an IPv4 address, an IPv6 address, an e-mail address or some specialized personal information number (PIN). It is also expected that if a UDDI method were to be used to propagate the service book to a mobile device 100*a*, only one or more specialized UDDI nodes 10 in the node cluster 8 would be capable of recognizing and delivering the information to the wireless network.

Method (B) also takes advantage of the fact that the mobile device 100*a* can support pushed information. One such method for pushing information to a mobile device is described in "System And Method For Pushing Information From A Host System To A Mobile Device Having A Shared Electronic Address," U.S. Pat. No. 6,219,694, which is owned by the assignee of the present application, and which is hereby incorporated into the present application by reference. By pushing the information to the mobile device 100*a*, the wireless user get immediate notification of the new service and can accept or reject the new service through a specialized user interface. This user interface is detailed in FIG. 6. Once the service book 32 is on the mobile device it can be cached and used at any time. This caching method will also act as a stepping-stone to full service provisioning, discussed later in this application. Once the service book 32 is on the mobile device 100*a* the application can directly access the service, probably using an Internet link, not shown in this figure.

Turning now to FIG. 4 there are two more advanced wireless methods shown. The first is labeled method (C). This new method is a wireless specific method that enables the wireless user immediate reception of the service book 32 directly on the mobile device 100*c*. This service book could follow the UDDI XML schema, a proprietary schema or some other new service book standard not yet released. This wireless specific method (C) of propagating the service book 32 assumes a direct relationship between the service offering 16 and the user of the mobile device 100*c*, or the service user. In the wireless world these close relationships are traditional and very common. This occurs because most wireless service offerings are customized and tailored for one or more mobile devices of choice. This relationship will be further emphasized later in the provisioning section with the use of specialized protocols and programs like Sun Microsystem's Java 2 Micro Edition (J2ME). One of the most common methods for delivering the service book 32 to the mobile device 100*c* would be using e-mail. This would use SMTP to deliver the message and the service book 32 would be contained within a MIME part of the message. It is also likely using e-mail that the service book 32 MIME part would be encrypted for security using a key that only the destination mobile device 100*c* would know.

In example (C) the service offering 16 maintains a list of customers or mobile device 100*c* to customer relationships, and is able to send out one or more service books 32 to the mobile device 100*c*. This allows the service offering 16 to update, delete, or extend the service book 32 entries on the mobile device 100*c*. Each time a change occurs to the service book cache on the mobile device 100*c*, the user could be prompted to make the final choice to accept or reject the change. For example for trusted service offerings 16 the service book cache might automatically get updated without user intervention. In all situations the service book 32 should be signed and encrypted for the maximum security. Some methods described in the UDDI service exchange procedure, talk about signing and encrypting the service book. It is certainly recommended that a public key or private key method be used to exchange the information. The most common case of this automatic service book update would be if the user acquired their mobile device 100*c* from the same company offering the service. Once the new service has been received the user of the mobile device 100*c* can then access the service offering 16 directly using whatever methods are allowed across the wireless network. These methods are described in more detail later through the provisioning section.

Another example shown in FIG. 4 is labeled path (D). Method (D) using a close proximity method to exchange the service book 32. This method provides for automatic security as the building or area being used for the exchange should be secured to start with. However if this is not the case, then a public, private or symmetric key should be used to encrypt the service book 32 before it is transmitted. The medium shown for the exchange 34 could be a wide-range of close proximity links. Some of the options include serial connection, USB connection. IR connection like IRDA, a RF connection like Bluetooth, or a broadband RF method like 802.11 or Bran. A close proximity exchange is unique because there is an implicit trust relationship built, especially when a serial port or USB method is used. In cases like 802.11 the distance can be greater so greater care must be taken when supporting these types of service book 32 exchanges. A close proximity connection also allows for bulk data transmission, which helps with provisioning as described later.

Figure 5:
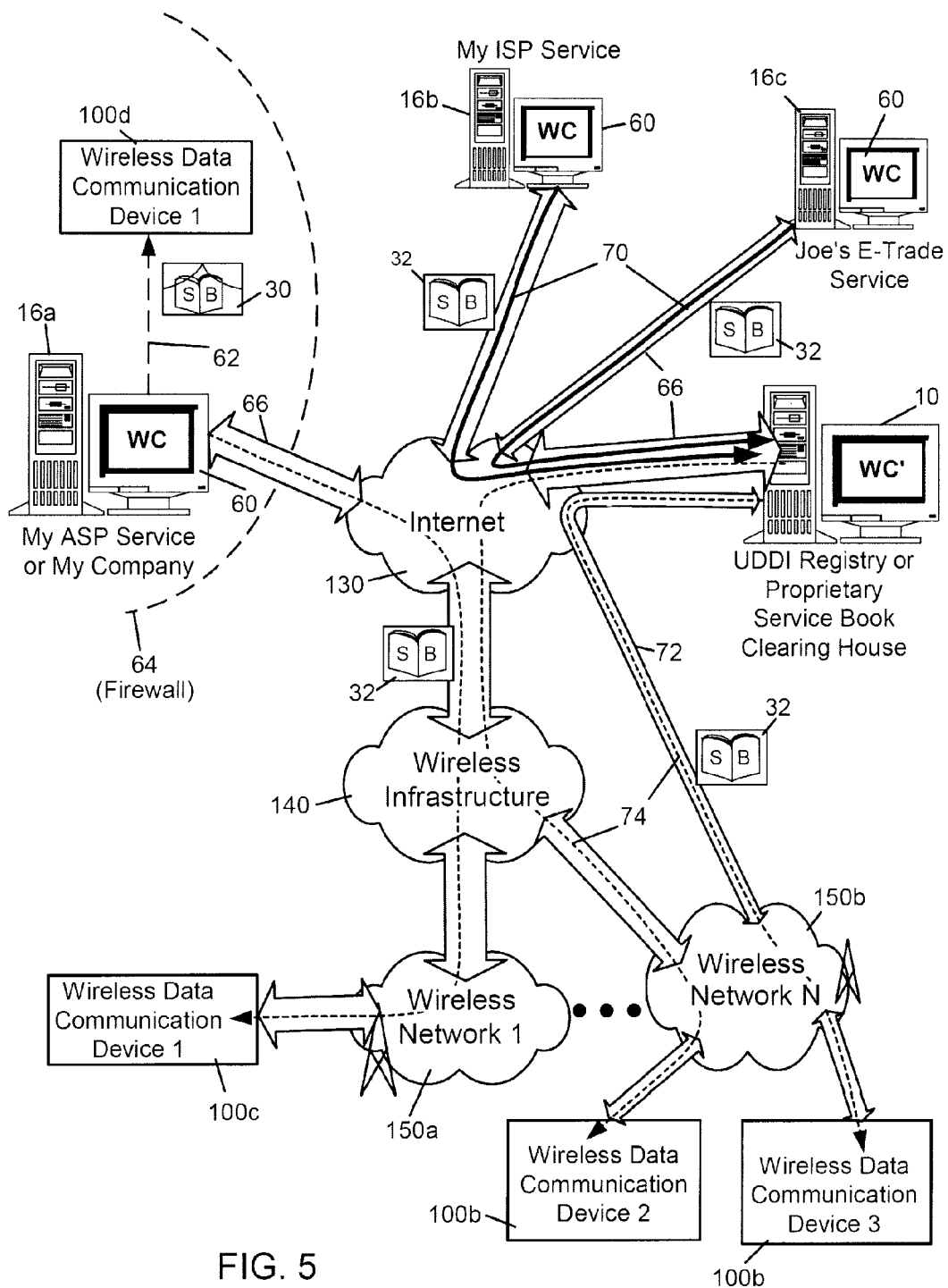
FIG. 5 shows three sample service offerings and how service books can be exchanged between the service offerings and the mobile device.

FIG. 5 shows three sample service offerings and how service books can be exchanged between the service offerings and the mobile device. FIG. 5 puts all the major elements together to show a more complex situation where services offerings and mobile devices co-exist. In FIG. 5 there are many host services shown and a sample network topology that interconnects WAN networks like the Internet 130 and wireless networks 150. One skilled in the art can appreciate there could be hundreds of different topologies, and the one selected is for illustrative purposes only.

FIG. 5 shows three sample service offerings 16, the "My ASP" or "My Company" host service 16a, the "My ISP" host service 16b and "Joe's E-Trade" host service 16c. Within the ASP 16a (Application Service Provider) or My Company 16a (my corporation) environment are a series of personal services used by the wireless users. When it is the user's company providing the service normally a firewall 64 is present to protect all company secrets. This does not mean that firewalls are not used with ASP, ISP and private services, only that corporations normally always have a firewall 64 present. When an ASP 16a is providing a service it might focus on: integrated e-mail, calendar, task and information services, exactly the same as my corporate environment 16a might offer. An ASP 16a may, for example, offer these services because the company is too small to justify the IT and machine expenses. They could also provide contact information, customized database access and a range of applications so the user can avoid installing these in their own office. Quite recently a larger ASP 16a like America Online (AOL) has been offering a wider range of wireless services to a community of mobile users.

The next example the service offering 16 is My ISP (Internet Service Provider) 16b service. Many ISPs 16b are starting to increase their value and differentiate themselves by offering wireless e-mail and wireless-friendly web portal information. A good example of this is Yahoo.com™ or Earthlink™ as more widely used ISPs 16b that are sensitive to wireless users. For most ISPs e-mail is the main item they wish to provide wirelessly, but in some cases they include configuration services and calendar services. The third example is a specific vertical solution called Joe's E-Trade Service 16c. This example represents a class of services like electronic trading, financial services, banking services and Internet-based m-commerce (mobile commerce). Joe's E-Trade service 16c also represents a large class of host services that offer nothing else but a vertical application solution. Unlike the ISP that is also offering Internet 130 access, the vertical solution is only selling one or more specific services like stock trades and stock information, flight booking and flight information, car trading and car purchase information, hotel reservations, weather information, real estate services, map information, sport scores and sports information, career and job information, people search and yellow pages information, business review information, games and music swap services or other possible host services.

In this example the topology of network connections show the Internet 130 as the main conduit to host services 16, a wireless infrastructure 140 and one or more wireless networks 150. The wireless infrastructure is an optional addition to the problem of delivering data to a handheld device 100 as it abstracts the wireless network 150 and allows a single host to reach a wide range of similar or dissimilar networks. A UDDI Registry system 10 or proprietary service book clearing house may also be provided, which has a direct connection 72 to network 'N' 150b. The easiest and most cost effective way for a service offering 16 to send data to the mobile device 100 is typically to direct it through the Internet 130. This is because most advanced host services already have links to the Internet 130 using one of many ways to exchange data with existing Internet users. The number of wireless networks 150 that could be linked with a wireless infrastructure 140 could be very large and diverse. These networks may include, for example, three different types of networks: (1) the data-centric wireless network, (2) the voice-centric wireless network and (3) dual-mode networks that can support both voice and data communications over the same physical base stations.

In each of the example host services there might be a wireless connector (WC) 60 present to custom the application for mobile devices 100. In some cases the WC 60 could be nothing more than serving up web information using a Wireless Markup Language (WML) format, in other cases it might involve advanced packaging and Java access services, like for e-mail redirection services. In many instances the wireless connector 60 is taking confidential and non-confidential corporate information and redirecting it out the corporate firewall to mobile devices 100. To perform this action the WC 60 might be compressing, encrypting and packaging the information for delivery. In the case of the UDDI Registry 10, the Wireless Connector '(WC)' is watching for an extended UDDI XML schema 32 and detecting the Wireless Information section.

One advanced element of the host services 16, is that they can be built to enable 'push' services to the mobile device 100. What this means is that service information can be asynchronously pushed to the user of the handheld device 100 without a previous action being performed by the user. The effect could be once I have registered for a service to get stock quotes, flight information, airfare seat sales, sport information, company inventory records, new contacts, new calendar events, new e-mail messages and a range of other service information pushed to my device all day and without prior action on the part of the user. These advanced actions would be performed by the WC 60 using protocols like TCP/IP or UDP/IP as describe in later sections of FIG. 5.

There is also a class of financial services that are 'pull-centric' that usually require users to log-on wirelessly to increase security. These pull-centric and push-centric communication methods allow data to follow users or allows user to reach their data wherever they travel. This immediate host service availability is enhanced by the incorporated "System And Method For Pushing Information From A Host System To A Mobile Device Having A Shared Electronic Address," U.S. Pat. No. 6,219,694. By using some of the methods described in the earlier application the ability to dynamically push new services to handheld devices is strongly enhanced. The experience to the user of pushed services and data is to providing richer and richer forms of data on the device for the end user.

Turning back to My ASP/My Company (My Company) service offering 16a, its WC 60 illustrates two ways to send the service book 32 to the mobile device 100. (In this illustration the service book is shown as a mail message with a book labeled 'SB' inside.) The My Company 16a service can use a close proximity link 62 (serial, RF, IRDA, Bluetooth, 802.11, etc) to delivery the service book 32 to the mobile device 100d. This method is done behind the firewall and is a unique method for point-to-point delivery of this critical service access information. Once this is complete the provisioning step could then take place as described in the next section. Once the first service book 32 is exchanged over the serial port, other service book entries 32 can be exchanged based upon the security established by the first service book 32. In an alternative embodiment the device uses a full public key infrastructure (PKI) and when initially started will register its public security key with the PKI. Once this is done each host service wishing to send a service book over-the-air to the mobile device simply has to request the mobile device's key from the PKI.

The second method used by My Company 16a is to delivery the service book 32 through the Internet to the mobile device 100c. To delivery the service book 32 over this link the service offering 16a might use an SMTP, WML or HTML method over TCP/IP, UDP/IP or some other proprietary technique that is specifically designed for this purpose.

Turning now to the My ISP service 16b and Joe's E-Trade service 16c they both use the central registry method for delivering their service book information. One embodiment would be to deliver the modified service book 32 over their respective Internet link 66 using a UDDI XML data exchange method 70 to the UDDI registry 10 or, if a UDDI register 10 is not available, then a proprietary service book clearing house 10. These services 16b and 16c might use this method over the direct delivery method to reduce direct dependency on the mobile device 100. They might also offer both wireline and wireless services using the same host or some programs. In this illustration the service book 32 is not carried in a message envelope, but could be sent using a variety of methods over TCP/IP. These include e-mail, HTTP, FTP, XML or HTTP, or some other proprietary method.

Whatever delivery method is used for the service book 32, the data items exchanged between the service offering 16 and the mobile device 100 via the wireless network 150 may include sensitive information or confidential information. A user of a mobile device 100 may also prefer that data items and service books 32 not be accessible outside the secure environment of the host system. In these situations the IT departments using a mobile device 100 might have control on how the service book cache on the mobile device 100 gets populated. This is especially true for the service book exchange, since it essentially 'enables' a new service 16 to exchange information with the mobile device 100. An encryption scheme is therefore preferably implemented between each service offering 16 or the service book clearing house 10 and any mobile device 100 with which the service offering 16 will communicate. In a private key encryption scheme, a common shared key is maintained for each service offering 16 that wants to exchange data with the mobile device 100. Public key encryption involves encrypting a message with a publicly available encryption key associated with either the service offering 16 or the mobile device 100. A resultant encrypted message may only be decrypted using a private key held by service offering 16 or the mobile device depending on which direction the message is sent. Public or private key encryption may be implemented within a system according to the invention without impact. Since a service book 32 can be packaged at the service offering 16 point, all intermediary network hops can route the message without regard to the message content. Therefore an encrypted message remains encrypted between a service offering and the mobile device 100, thereby creating an end-to-end secure communication link. An exception to this would be when the service book clearing house 10 is used. In this case the service offering 16 and the service registry 10 would either share a common encryption method or they would not encrypt service book 32 data between them.

Figure 6A:
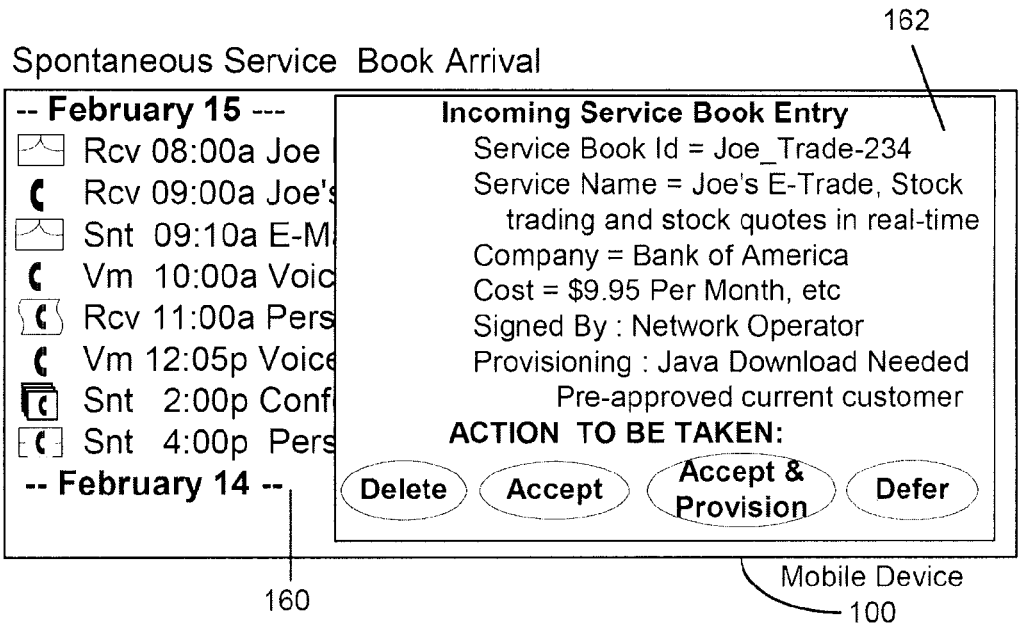
FIG. 6a is a presentation of an innovative user interface (UI) for service book entries on a handheld device.

Turning now to FIG. 6a this is a presentation of a user interface (UI) for service book entries 32 in which specific UDDI service books 32 are cached on a mobile device 100. When a new registry entry arrives the user could be working anywhere in the many mobile device 100 sub-systems. In this example the user is working in a unified events listing screen 160 perhaps looking at previous events or about to read a mail message, about to respond to a mail message, or many other possible tasks. The mobile device 100 might first notify the user that a message has been received on the mobile device 100, perhaps through an audible alarm, through a visual alarm on the screen or through a visual indicator like a physical light on the mobile device 100. At this time the user might be able to dismiss the interruption, or might be given the illustrated new service book arrival dialog box 162. This dialog box 162 could have many configurations and formats, this is just one representation. There could also be many user interfaces to the UI as well, including touch screen input, menu selection input, push buttons, mouse movements keyboard input and others just to name a few. In this representation the UI shows as many pertinent service book 32 elements as possible. The dialog box also allows the user to DELETE, ACCEPT, ACCEPT & PROVISION or DEFER the new service book entry—as button choices in the dialog box itself. The 'delete' action effectively removes it from the mobile device 100 and the service is ignored. The 'accept' action will accept the new service book entry, and if advanced provisioning is required defer this to a later time. The accept choice may, in some circumstances, also add a new menu option to the main menu of the handheld device 100. This could be used later for launching the new service. The 'accept and provision' action will accept the new service book and start the provisioning process. The ability to automatically start provisioning might involve starting to download an application to be used with the host service; this is described later in greater detail. The 'defer' action is similar to 'ignore for now' and the user will be able to enter the service book sub-system to review the new service book entry in greater detail before accepting it. This final approach is most common when the service book 32 is somewhat unexpected by the user and they want additional time to consider their choices. However, even after accepting the service book it is always possible to remove the entry later if the user is not happy with the nature or behavior of the host service offering.

In this example many of the service book's 32 elements are presented to the user, but some may have to be left off depending on the implementation. Naturally, it would be possible to include the entire service book 32 contents and allow the user to scroll or traverse the entire contents. The selection of which elements to show first, second or last are arbitrary and do not affect the usefulness of the invention itself. In this illustration the business elements are most useful for helping the user to determine the purpose of the service book 32. Normally new service books arrive infrequently on a mobile device 100, so each time they do arrive they are important events for the user to pay close attention to. The service book id is shown as Joe_Trade-234 is a reference number that might be used later, or it could be used in provisioning over the phone. The service name itself is a user-friendly string that gives a description of the purpose of the service. The service name also has a description attached showing that the E-Trade service is for performing stock trades and getting stock quotes. The company offering the service is called 'Bank of America' which would normally be included to inspire confidence and trust in the service offering. Ideally the service offering would include a monthly charge, in this example that is $9.95 per month. The security method used on the service book 32, considering it arrived over the air to the mobile device 100, is also important. In this example the network operator, helping to confirm that the service book is legitimate, signed the service book 32. In this example there is advanced provisioning required—a Java application must be downloaded. Since the user is shown to be an existing customer of the bank, the bank is extending the existing customer status to include wireless access to their stock portfolio. In other example the bank might have requested a credit card or bank account number to confirm a line of credit to cover the monthly expenses. Finally, after reviewing the information the user makes a dialog box menu or button choice to clear the dialog box to continue with their work. In this example if the user selects 'Accept and Provision' the downloading of the application will preferably take place in the background so the user will be able to continue with other work. As described earlier the location of the download will be embedded in the service book 32 as received from the host service 16 or the service book clearing house 10. The download process is described in further detail later in the provisioning section.

Figure 6B:
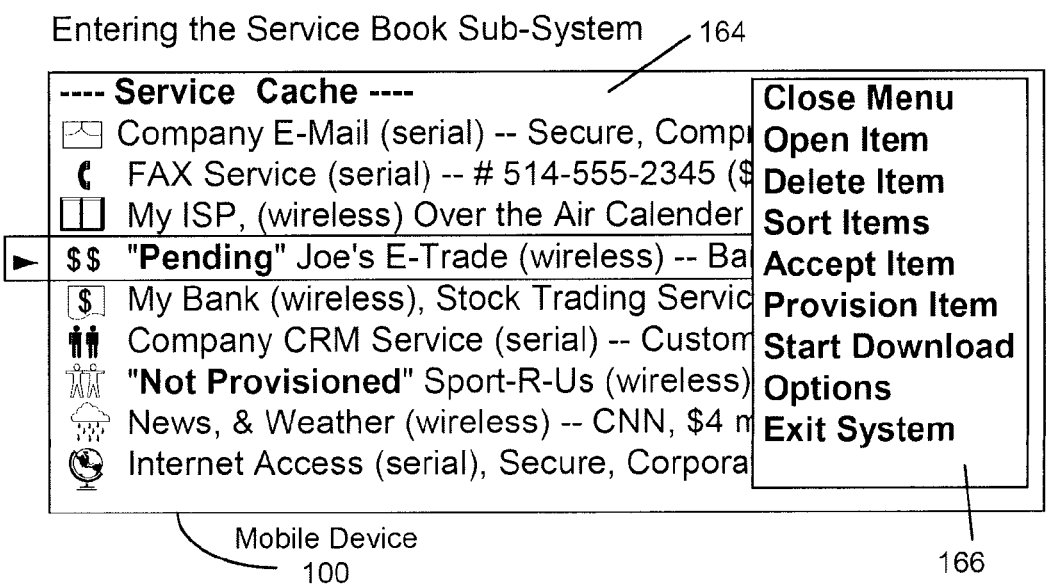
FIG. 6b shows an example of what the service book subsystem might look like on the mobile device.

Turning now to FIG. 6b, this shows an example of what the service book sub-system 164 might look like on the mobile device 100. The service book sub-system 164 might be accessible from the main menu of the mobile device, or perhaps even from the options sub-system, there are many possible embodiments. Like other sub-systems the service book sub-system 164 shows all the currently held service books 32 in a scroll bar method for easy access. Naturally other embodiments are possible like using a touch screen scroll bar, using a mouse wheel or thumb wheel. Each line represents a different service book that is either accessible to the user, or is pending for the user to review. In this example the arrow has stopped at Joe's E-Trade service, which is also shown as pending. For illustration the arrow pointing represents the cursor location and the focus of the user's attention. In this UI illustration each service also has a icon depicting the service—these can be used to reduce the user's time when searching for services. The method of how the service came to arrive onto the mobile device 100 is also shown. It is expected that some user customization might be allowed so that they can view exactly what suits them. This is similar to how a user can custom an e-mail viewing window to select from subject fields, time fields and from fields of each e-mail message. As the user scrolls through the list they can at any time invoke a menu of choices 166 that can be performed on any given service book entry. The user also might cancel the menu of choice 166, or even leave the service book sub-system 164 altogether.

The menu of choice represented here is only an example and additional options are possible. Starting from the top of the list the user can close the menu and return to scanning the entire list of services. The user can 'open' an item and look at an even more detailed view of all the elements of the service book entry. The user can 'delete' the service book entry. The user can 'sort' the items, perhaps sorting by all items received wirelessly. The user can 'accept' an item, for example if an item is pending (shown with Joe's E-Trade) they can accept the item so that it is considered usable thus allowing provisioning to take place. In many cases the accept choice may also add a menu item to the main menu, showing all available applications on the mobile device 100. The advantage of this would be for easy access and for fast launching of the application at a later time. However, if download of an application is required then the accept choice would probably NOT place an icon on the main menu. The item can be provisioned, for example the Sport-R-Us service has been accepted, but has not been provisioned. The user can try to force a 'download', which might be needed as part of provisioning. This could optionally have the side effect of checking for an updates to the software used with a service. Once the download is complete the application's startup algorithm might be executed which would place a icon on the main menu. This icon would allow for easy access to the new program and would allow the user a quick launch method. The user can also select to modify the 'options' supported in this sub-system. The options could include display options, auto-acceptance options or other advanced service book features. Finally in this example the user could exit the service book sub-system.

2. Service Provisioning and Application Download

A limitation in the current art of dynamic service description, discovery and integration is the concept of service provisioning. This term can mean many things depending on the definition, so this application will propose some language to help understand the step of provisioning. Due to the wide variety of host services available, and their complex nature, each one could require slightly different elements to ensure that it is provisioned. The highest-level definition for service provisioning in this application would be: "performing the necessary steps to fully utilize a service offering after having detected its existence". In this definition it is assumed that the user has detected the service, such as by receiving the service book, and the user desires to use the service in question. These necessary steps to use the service in question will normally include following one of the following methods, although the following list does not represent a complete list of methods possible for provisioning:

(1) Once the service book has been accepted the user simply has to invoke an icon on the main menu. In this situations the resident web browser on the device will be launched with a URL on the command line that would immediately be reached to find the target host service.

(2) The user performs a manual or automatic provisioning step and downloads a Java application that places an icon on the main menu. The application detects the service book entry to identify the address of the corresponding host service, and when launched proceeds to exchange data and perform service activities.

(3) The user first downloads a Java application to the mobile device 100. The user then launches the application and it confirms the service book entry is present to find the host service. The application then prompts the user for a user name and password to access the host service more securely and to confirm identity.

(4) The user first downloads a Java application to the mobile device 100. The user then launches the application and it requests a credit card number and expiry date. This information is sent securely back to the host service and a credit check is preformed on the user requesting the service.

(5) The user first downloads a Java application to the mobile device 100. The user then launches the application and the user name, address and contact information is taken by the application. A quick check is performed with the host service to confirm the user is known or unknown. The user is then given a dialog box asking them to call a specific number to be provisioned to use the service offering.

(6) The user first downloads a Java application to the mobile device 100. The user then launches the application and it confirms the service book entry is present then it prompts the user to enter a number from a SecureID™ token provided for advanced security into the host service.

(7) The user first downloads a Java application to the mobile device 100. The service also comes with a smart card reader, retinal scanner or finger-print scanner which is attached to the mobile device. The user then launches the application and it requests that the user enter their smart card, provide a retinal scan or provide a finger print before being allowed to access the service offering.

Figure 7:
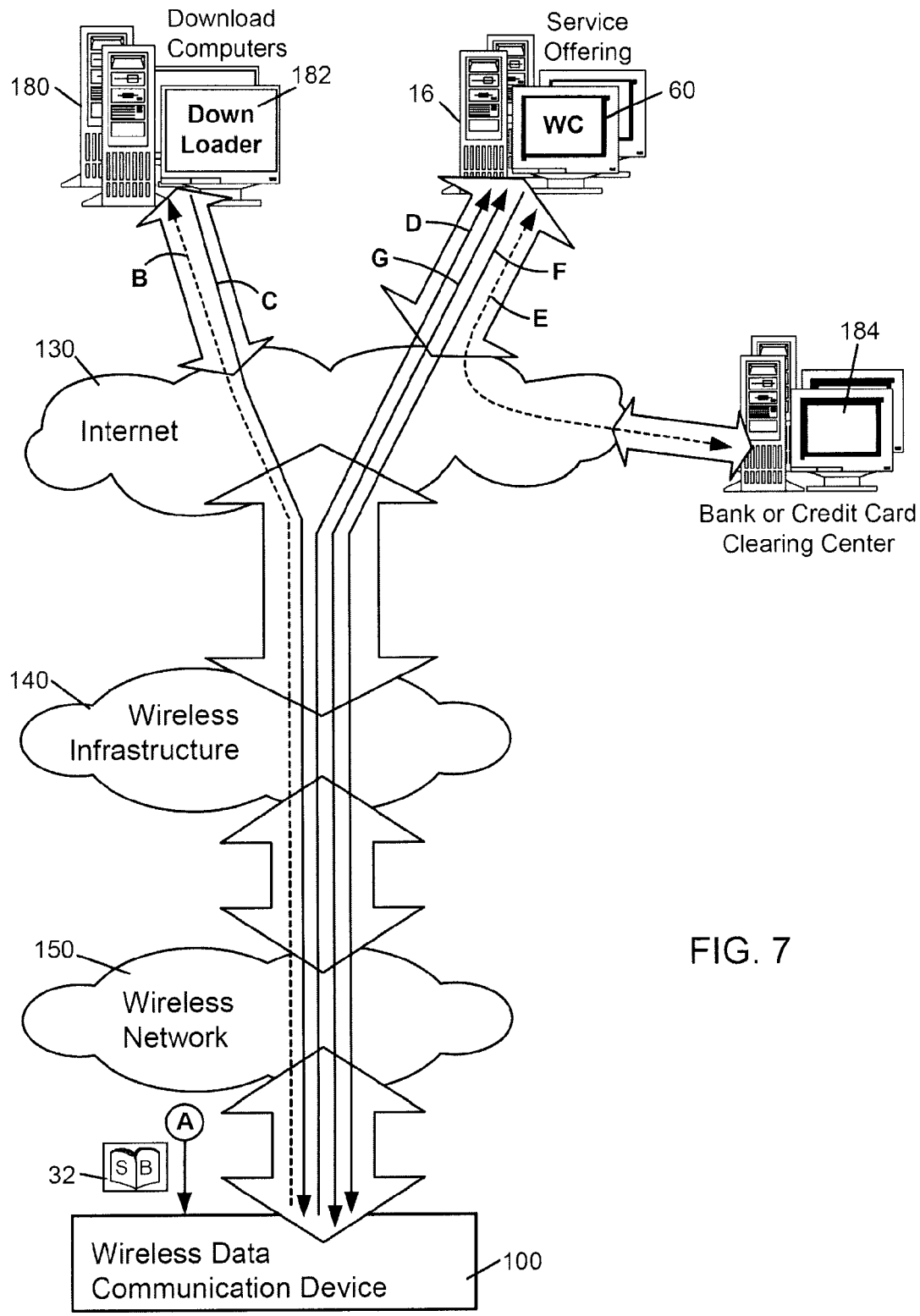
FIG. 7 is an exemplary example of provisioning in a wireless environment.

Turning now to FIG. 7 there is an example of provisioning in a wireless environment. This illustration depicts a sample set of steps used to establish the service, download the necessary application, confirm credit and payment terms and finally to access the service offering. This visual representation is complemented by FIG. 8, that uses a time sequence diagram to show the same steps in another way. The first step (A) that takes place just before provisioning is that the mobile device 100 user gets a new service book 32. The service book 32 might have been retrieved using a 'pull' browser model, it could have been pushed to the mobile device 100, for example, using a method described above with reference to FIGS. 3 and 4. Once this user has accepted the service book 32, then the user can perform a provisioning step (B) like downloading the necessary application to support the service offering 16.

The application download URL within the service book 32, might direct the mobile device 100 to one or more computer systems 180 dedicated to downloading applications. The advantage of this would be that the service offering 16 machine will be able to perform the service better and the heavier overhead of downloading is offloaded to another set of computers 180. Within this set of download computers 180, would be a downloader application 182, specifically built to performing streaming download of large Java (J2ME) programs to the mobile device 100. Java 2 Micro Edition (J2ME) is a recent standard from Sun Microsystems™ that defines a subset of normal Java for small handheld and wireless devices. The J2ME version of Java is designed for over-the-air download with low overhead and size. Java is not the only downloadable format for programs and others are possible like C# (C Sharp) from Microsoft™ and other proprietary interpreted and compiled programming language formats. Since the application download is running the background, however, the user is typically unaware of the time required to complete a download. Once the application is fully downloaded it might be given a chance to run a startup routine, or perhaps part of the download allowed the main menu icon to be specified. The downloaded application may provide an icon for the main menu so the user can easily launch the new application.

Once launched, the downloaded application checks to ensure the correct service book 32 is present on the mobile device 100. This will ensure the user hasn't deleted it, or the application hasn't been loaded on a given mobile device 100 in error. The application will either check for the service identifier, or it could use a series of defined UDDI Interface calls to explore the local service book cache for the correct entry. Once launched the application could then perform a range of activities depending on what the downloaded program (for example J2ME software) has been designed to do. In this embodiment the J2ME, program prompts the user for personal information, address information and credit information. While it is running it also communicates to the other sub-systems on the mobile device 100, like the operating system, to determine the mobile device type, the capabilities of the device, the CPU speed, the memory size, the network type, the screen size, the input methods and any other pertinent information that could be used by the service offering. This information is then sent to the service offering 16 computer (D) to perform the second stage of provisioning. The service offering 16 might do several things with the information. It could log the information for later usage or review. If mobile device 100 information is present, it will save this information for each host system to access when full two-way communications are confirmed. It might also prepare and send a credit check message to a bank or credit card clearing house (E). Based on the response on credit authorization the service offering 16 will respond back with an positive or negative acknowledgement on the service initiation request (F). If the response (F) is positive, the user of the mobile device 100 is then able to start a full two-way dialog (G) with service offering 16.

Figure 8:
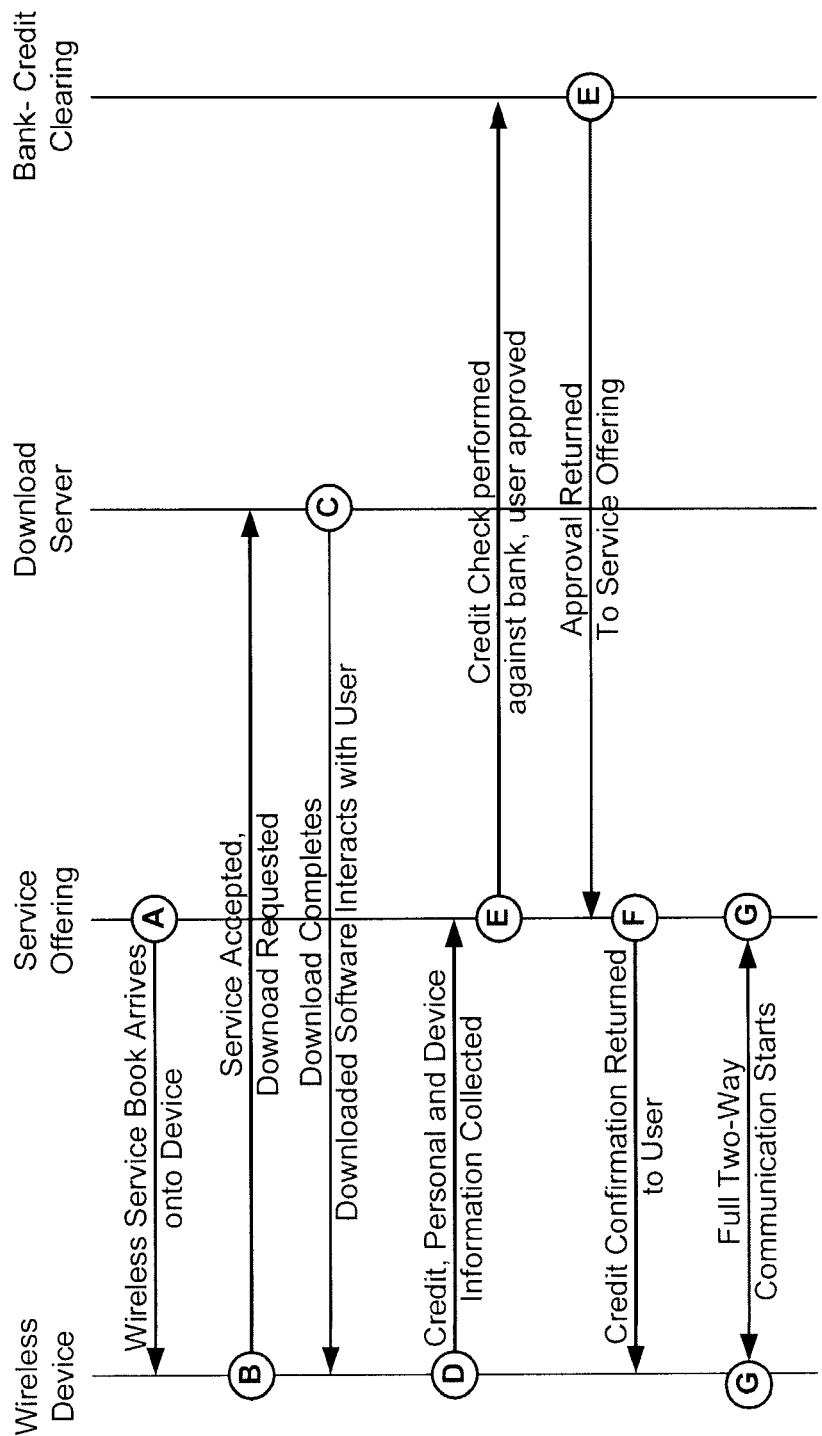
FIG. 8 uses a sequence diagram to illustrate the steps necessary in an exemplary method of provisioning.

FIG. 8 uses a sequence diagram to illustrate the steps necessary in an exemplary method of provisioning. The steps can be seen as progressive in nature. At any stage if the previous steps haven't taken place the process stops. If the user never downloads the application credit approval can never take place.

3. One Implementation Embodiment

Figure 9:
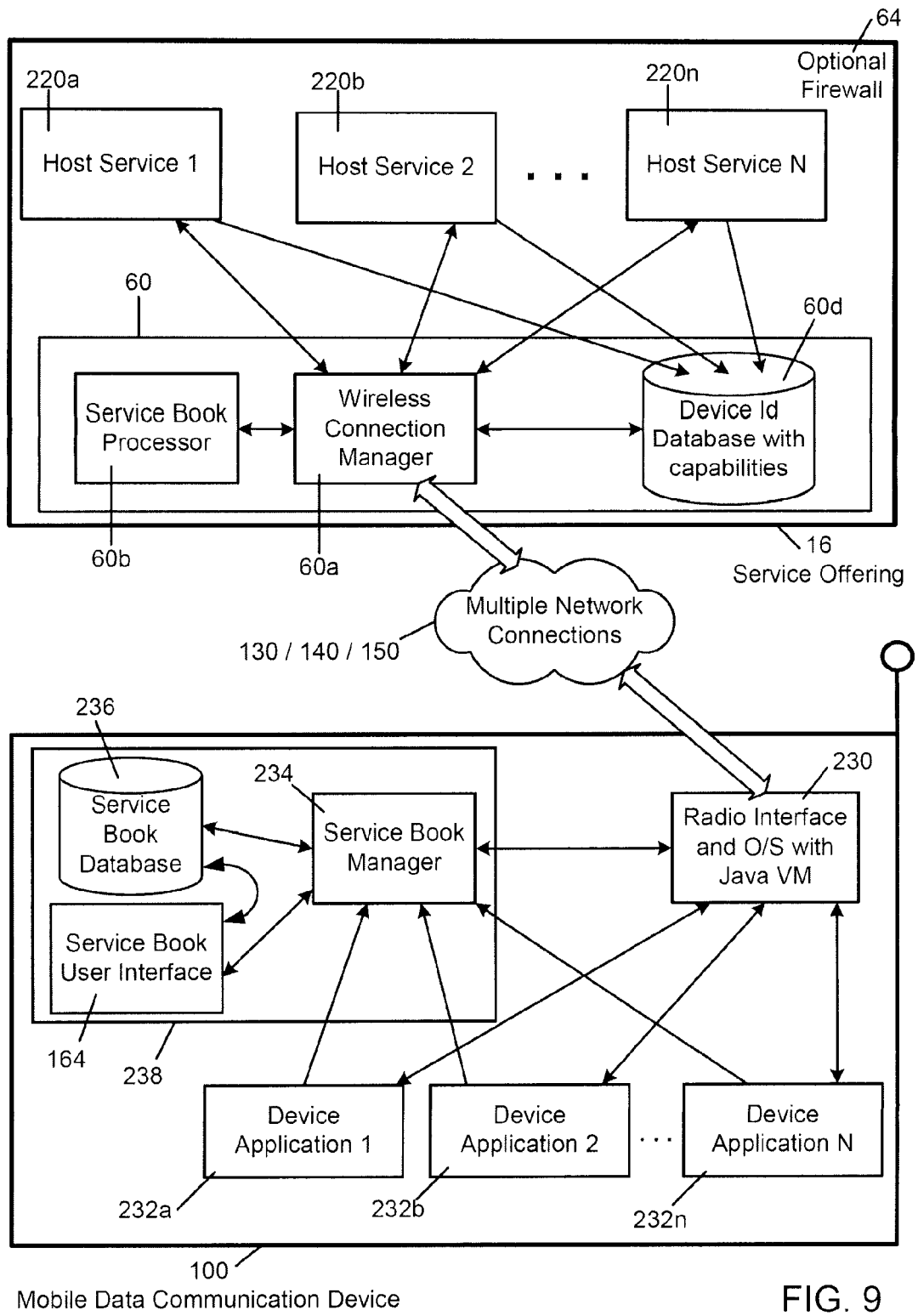
FIG. 9 is one sample internal design for the service book components on the service offering and the mobile device.

Turning now to FIG. 9, one sample internal design for the service book components on the service offering 16 and the mobile device 100 is shown. The service offering 16 is normally surrounded by a firewall 64 that protects all information from the hackers on the Internet 130. The service offering 16 is normally connected through one or more network connections (130, 140 and 150) to the mobile device 100. For the sake of this illustration this connection is performed by the wireless connection manager 60*a*, which is one component in the wireless connector 60, previously described. The wireless connection manager 60*a* could use many protocols and methods to exchange data with the mobile device 100. The most likely protocol would be some form of data exchange over TCP/IP or UDP/IP. This data exchange could use SMTP to carry UDDI messages, with SOAP commands, in an XML format to the mobile device 100. The data exchange could be a proprietary service book 32 format, over TCP/IP using a FTP data exchange protocol. It should be understood, however, that there are many ways to exchange data elements, depending on what is supported through the wireless network and within the mobile device 100.

The wireless connection manager 60*a* also offers an API to other components on the service offering 16. In this example there are three host services 220*a*, 220*b* and 220*n* all offering a distinct and unique service. The host services also have access to a device Id and capabilities database 60*d* that provides the relationships to the mobile devices 100. In this embodiment once a host service 200*a* is started it would communicate to the device Id database 60*d* and determine a list of mobile devices 100 it wished to offer the service to. This determination could be based on a configuration file for the host service 220*a*, or it could be a blanket offering opened to all existing and known users. There are many ways this device Id database 60*d* could have been built. For example each time a mobile device 100 was plugged into a serial port on the corporate LAN, its device Id information could have been collected and stored in the database 60*d*. Alternatively, a service operator may have input the information manually into the database 60*d*; for example through a point-to-point phone conversation. Another embodiment could have the database being built via a web interlace, where mobile device 100 users enter their wireless information and desired services. The database will also be updated to indicate which service books 32 have been transmitted to the mobile device 100. This can be used later for management and diagnostic purposes. When the mobile device 100 accepts the service book 32 and a response is received the capabilities are then added to this database so that a master list of mobile device 100 capabilities can be kept for host service access.

Once the host service 220a determines which mobile devices 100 want their service offering 16, they request help from the wireless connection manager 60a. The wireless connection manager 60a exposes an API to allow any host service 220a to request service books 32 be built and sent to mobile devices 100. As described above, there are at least 4 methods that these service books 32 could reach the mobile device. The host service 220a might request that the service book 32 be sent to a UDDI Service Registry 8, using traditional UDDI registration methods. The host service 220a might request that the service book 32 be extended with wireless information and provisioning data and sent to the UDDI Service Registry 8. This would eventually have the effect of pushing a new service book 32 to the correct destination mobile device 100. The third method is that the host service 220a might request that the service book 32 be sent directly to the mobile device 100, using a push technique. The fourth method could be that the host service 220a only wants the service book 32 to be exchanged over a close proximity link, like a local serial port. This selection process is all part of the API offered by the wireless connection manager 60a. The wireless connection manager 60a then turns to the service book processor 60b to perform the step of creating the necessary service book format. This might also include compressing, encrypting and packaging the information for delivery. The service book processor 60b might also encapsulate the information into an SMTP message, or a UDDI message as required.

Turning now to the mobile device 100 in FIG. 9 the main wireless interface point is the radio interface layers 230 and the operating system (O/S) within the mobile device 100. The radio layers 230 within the mobile device 100 are the first to get information and pass it up to the O/S and eventually up to the Java Virtual Machine (JVM) when present. Using Java is optional but it is an exemplary method for creating an extensible mobile device 100 platform. The service book manager 234 will be connected to the O/S or JVM like the other major wireless programs on the mobile device 100. The service book manager 234 will recognize and decode the service book 32 as it arrives in. The service book will use O/S or JVM resources as necessary to decompress, decrypt and unpackage the information so that it can be presented to the user. The service book manager 234 is one of many service book components 238 on the mobile device 100. To assist the service book manager 234 is a User Interface (UI) program 164 that presents the newly arrived service book 32 to the user for evaluation and review. The user can then accept the service book 32 right at the time of arrival, or they can defer the decision to a later time and re-enter the service book UI 164 at their leisure. On the mobile device is a cache or database 236 of all accepted or pending service books 32. The service book database 236 is a resource to the service book UI 164 as it presents options and alternative to user for manipulating known services to the mobile device 100.

Once the user starts provisioning, the service book manager 234 exposes an API to the service book UI 164 that allows a download to commence. Part of the service book manager 234 implements a very small portion of a web browser, or a similar functionality to fetch a resource located at a specific URL. Within the service book 32 itself is the address information (URL) that is used to locate the download file, related to the service book just accepted and provisioned by the mobile device 100 user. Once the download completes the newly loaded device application 232a, 232b or 232n uses the service book manager's 234 API to review known service books 32. It extracts the information necessary, based on a keyword string like the service name, to reach the correct destination service offering and also what further provisioning is required. If necessary it prompts the user for information, like credit information and proceeds to send this to the host service as defined in the relevant service book 32 section. This information might also include device capabilities reachable through the O/S and/or JVM when present; this was described earlier in this application. Once the host service 220a, 220b or 220n, is known and provisioning is complete, the mobile device application 232a, 232b or 232n opens a communication link for data exchange.

This internal representation of the service offering 16 and the mobile device 100 illustrations just one possible implementation of the software needed to perform the invention. It should be understood that many other implementations are possible, for example a separate service book database could be maintained on the service offering 16.

Figure 10:
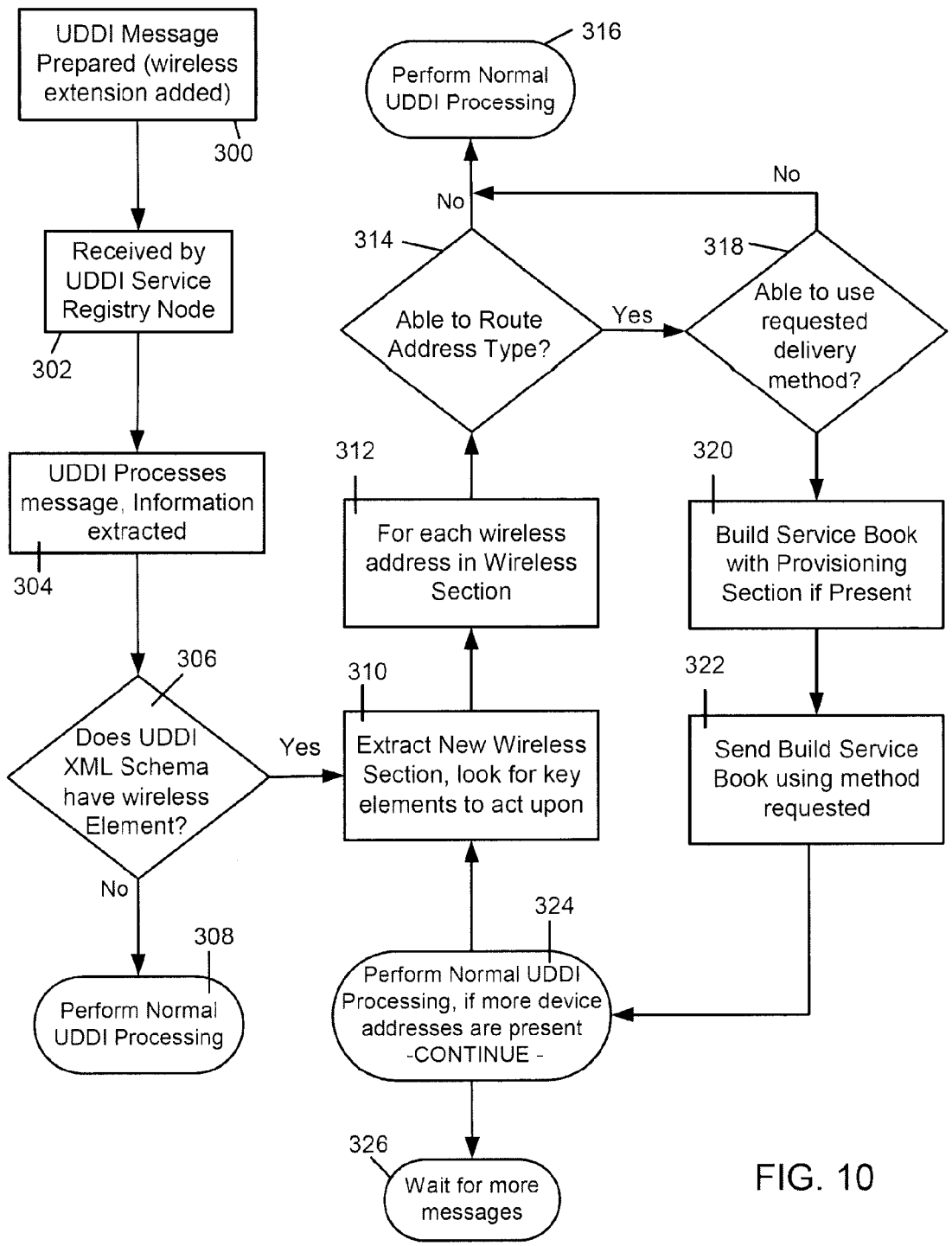
FIG. 10 represents a flow diagram for how a UDDI Registry node my handle a modified UDDI XML schema message.

Turning now to FIG. 10 this represents a flow diagram for how a UDDI Registry node may handle a modified UDDI XML schema message. The first step in this data flow diagram is the preparation of a service book message 300. This service book message 30 or 32 might follow the UDDI XML schema exactly 30, as defined by the UDDI specifications publicly available. This message may extend this UDDI XML specification 32 and use some proprietary wireless extension, or it might use a proprietary format and a private Service Book Clearing House 10 as described in FIG. 5. Once this message has been sent it is received by one of many UDDI Registry nodes 302. In an exemplary implementation the transmission would take place over the Internet and follow standard TCP/IP transmission techniques and the format would follow the specifications for UDDI data exchanges. During this reception the message is opened and examined to determine the type of command and the action required 304. A test is then performed by this UDDI registry node to see if the UDDI XML schema has been extended to include wireless sections 306. If it does not then the full UDDI processing is performed and the service offering is placed in the UDDI service cloud with all other public services 308.

If the UDDL XML schema does have wireless elements 306 the new wireless elements are extracted 310 and the required directives are assembled. There could be many mobile device's listed in the wireless section and for each one a series of steps are performed 312. First the type of route is examined 314, for example which wireless network type must be used to reach the mobile device 100. As shown in FIG. 5 the path to the mobile device 100 could go directly to the wireless network 150b or through a wireless infrastructure 140. In the later case many connections to wireless networks 150 could be abstracted through the one common interface. If the UDDI registry node does not have a path, or cannot support the specific wireless network then normal UDDI processing is performed and the service book is added to the registry 316. If the network requested can be supported 314 a further test is performed to ensure that the requested delivery method is supported 318. The delivery method or encapsulation of the service book might require a UDP/IP delivery or TCP/IP, using FTP, SMTP or some proprietary delivery protocol. If the method cannot be supported the UDDI registry node proceeds to perform normal processing and places the entry into the registry 316. Otherwise the wireless processing continues as the UDDI node builds the service book message following the requested format 320. Then the service book is sent, or pushed, to the mobile device 100 following the delivery method defined in the original service book message 322. Then after the processing is complete or the wireless delivery notification the UDDI registry node performs the normal processing and places the service book into the registry 324. If there are more wireless addresses present the process continues, until all addresses are checked and processed. When there are no wireless addresses remaining the UDDI process node returns to a steady state to wait for further commands and work to do 326. These steps highlight, at a high level, a straightforward method to extend the UDDI operation to handle a wireless extension to the XML schema defined for UDDI command operation. With the support of push delivery mechanisms in new wireless networks the ability to use standard TCP/IP and UDP/IP datagrams to push information to handheld devices makes this extension to UDDI possible.

Figure 11:
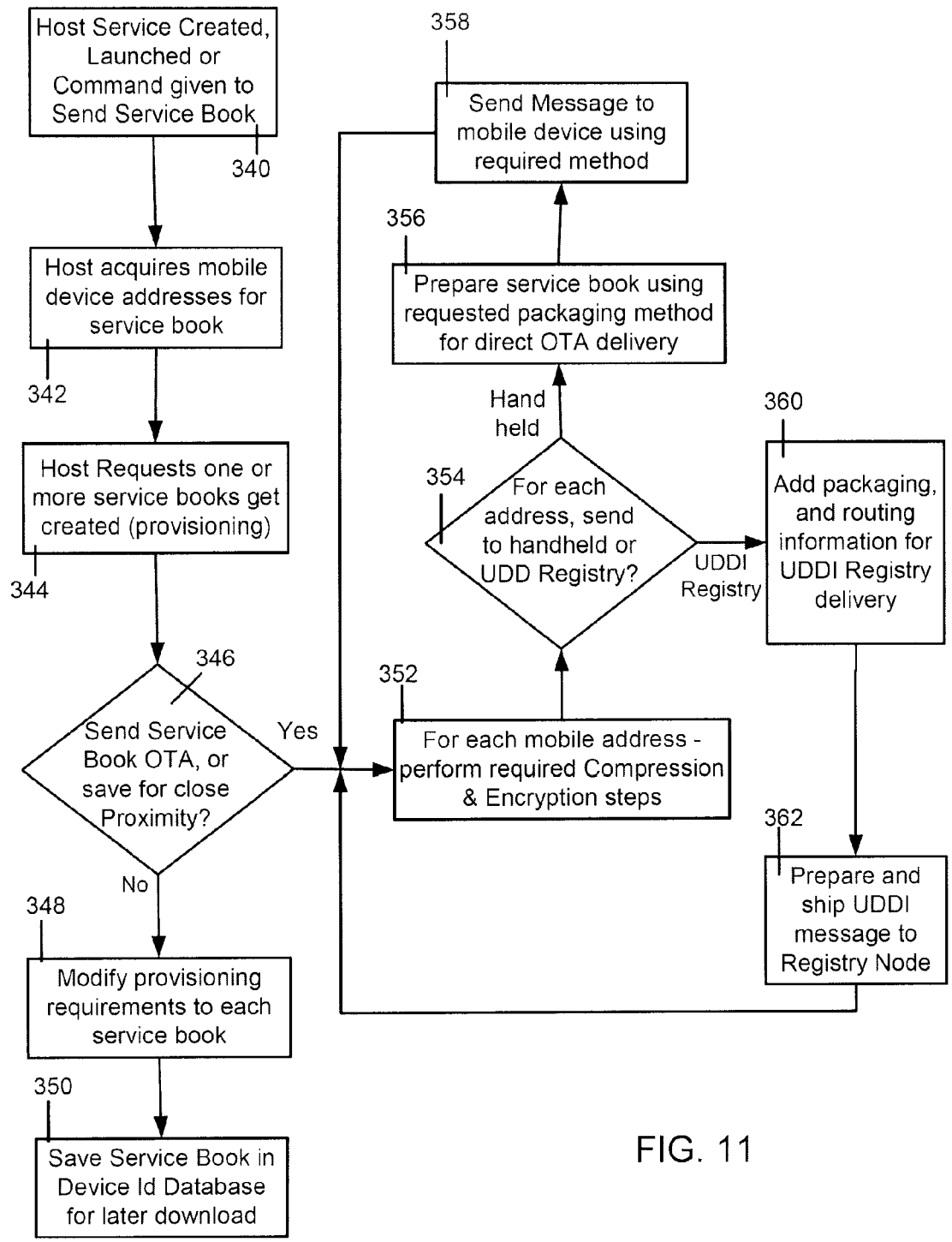
FIG. 11 represents a flow diagram for how a host service prepares and send a service book.

Turning now to FIG. 11 this represents a flow diagram for how a host service prepares and sends a service book. The data flow starts when a host service starts and detects that it must send out service book information to mobile devices 340. The host service could be newly created, and detects that none of the existing users have received a service book. It could be that the host service has been notified of a change to the Device Id database file, where a new user has been entered for the service. Alternatively the program may have been launched with a file of new users, or a single Device Id on the command line of the program. The host service might be one of many host services within a service offering 16, as shown in FIG. 9. If the host service doesn't have the one or more device identifiers it will need to determine them. These mobile device 100 identifiers mobile are used to targeting or address the new service book entries 342. There are many ways one or more mobile device addresses can be discovered. In the descriptions provided for one embodiment, in FIG. 9, the mobile device has plugged into a serial cradle and the device identifier has been placed into a Device Id and Characteristic database. An operator might have entered those user's mobile device addresses that want the service. They could be received over the air, or from a web site where users register for the service offering.

After having collected the necessary mobile device addresses, the host service can either build the service book directly or request a service book manager or formatter to assist in building the service books 344. This could be an single application program interface (API) call, or it could take many interactions to build the one or more data structures used for service book delivery. The service book creation will include following either a standard format, like UDDI XML schemas, or a proprietary format depending on what the device characteristics are. At this stage the service book might also include the various provisioning requirements, which might include one or more of the following requirements: (1) application downloading, (2) download address information, (3) credit information, (4) type of credit information required, (5) personal and addressing information and overall service length, type and variety. This is not an exhaustive list but a representative list of the types of issues and questions that should be resolved during the provisioning stage of using a host service. In an exemplary embodiment this information is kept secret between the host service and the mobile device user.

The next step is to determine if the service book will be sent over-the-air (OTA) or through a close proximity link 346. If the service book needs the highest level of security, or if the system doesn't support OTA service book delivery, then it will use a serial port, IRDA link. RF link, Bluetooth method, or some other close range method for delivering the service book. In this case the provisioning section might be modified to reflect what is needed and it is possible that any necessary Java applications could be downloaded when the mobile device is in close proximity. Then the service book, with any provisioning requirements, is placed in the service book database, or the Device Id and characteristics database. When the mobile device makes itself known, through a close proximity link, the new service book and any necessary applications will be downloaded to the mobile device—normally with the user's permission.

If the service book is going to be sent over the air (OTA) 346, the OTA processor checks the mobile device capabilities, or the configured information entered during registration, to see what special message preparation should be preformed. In an exemplary embodiment the service book is compressed and encrypted so that only the user of the mobile device is capable of opening and reading the entire contents of the service book information 352. Once the service book is prepared for the mobile device, a check is preformed to see if the service book is being sent directly to the mobile device, or it will go through a service book registry, like the UDDI registry 354. There is the option of sending it to the UDDI registry only, which no further redirection to the mobile device 100, but this logic is not shown here, as it does not apply to this application. If the service book message is going directly to the mobile device, the final packaging is performed on the service book 356. Then the service book is sent using the required method 358, which could have been configured by the original mobile device user when they requested the service. The message could be sent via a specified MIME part within an E-mail message, via an extended SMS, EMS or MMS message, via FTP over TCP/IP, or using a proprietary method over TCP/IP or UDP/IP.

If the delivery method is to use a registry, like the UDDI registry 354, the first step is to added wireless routing elements so that the one or more mobile devices can receive the service book 360. The message to the UDDI registry node may include only a single mobile address per message, or it may contain a list of mobile devices all wanting the same service book. In either case, all the necessary routing information is appended to the optionally secure service book so that the UDDI registry node can push the service book to the mobile device user 360. This information could include the device identifier, the wireless network name and type used by the mobile user, and the delivery method that must be used to push the information to the user. Finally the message is prepared for shipment to one of many UDDI registry nodes and it is sent 362. It should be understood that there are many options that could be used, for instance both UDDI and proprietary service book clearing house methods could be used, either independently or together. In addition, it is possible that many sends could take place to ensure population to the correct registry supporting the user. Since there is very small negative impact if the user receives the same service book more then once, multiple sends to different registry locations are possible.

Depending on the API calls, and how the original mobile device addresses were prepared, this process may continue until all mobile device addresses are handled. In one embodiment, mobile device addresses may be grouped based on how they wish to receive the service book. In this method a group of common mobile devices all are processed at once and the next time through the loop another group of mobile device addresses are processed.

Figure 12:
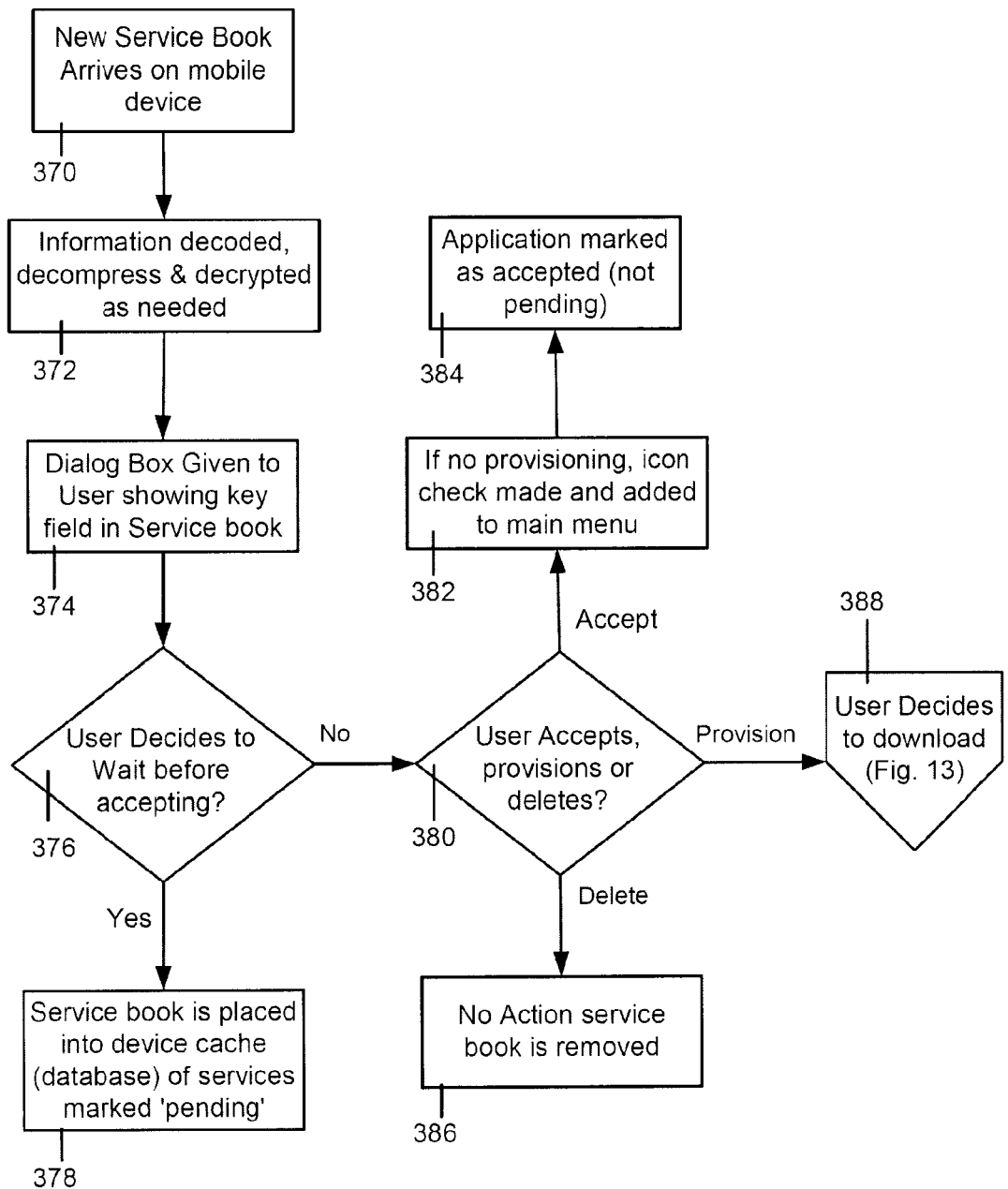
FIG. 12 represents a flow diagram for how a service book is processed on a handheld device.

Turning now to FIG. 12 this represents a flow diagram for how a service book is processed on a handheld device. The first step is the arrival of a message containing a service book 370. This could arrive in directly via a TCP/IP link, or it could have arrived within an e-mail message, or even via a native wireless network protocol. The information within the service book could be encrypted and compressed, so the next step would be to perform decryption and decompression as required 372. Once the contents are extracted and some verification takes place, the user can be notified of the new service book and a dialog placed on the mobile device's screen 374. The dialog box could present one or more fields within the service book to the user. The design of the dialog box is important and in an exemplary implementation the dialog box has a full description, the costs and the service provider information. The goal is to assist the user to identify why they have received the service book, who it comes from and do they want to accept it onto their mobile device.

As they review this information they make the decision to accept, reject or defer action on the service book until later 376. If they defer action the service book is placed into the service book database 378, which is effectively a local cache of all relevant service book entries for this particular user. The entry is marked as pending, so that the user can quickly identify it when they enter the service book sub-system and access the service book UI. If the user has not deferred the service book they might have either accepted, accepted and provisioned or deleted the service book. If they truly don't like or don't understand the received service book they can immediately have it deleted from the device 386. If they accept the service book this will place it in the service book database without a 'pending' indicator on it. For some services this might be the only step necessary to use a given service, for example when the necessary application is already on the device and the routing information out of the service book is all that is required. If the user does perform an accept 380, the service book entry is checked to see if provisioning is required, if not any icon that appears in the service book entry is placed on the main menu of the mobile device 382. Adding the icon to the main menu is an optional step but can make finding and launching the new host service easier. In some cases the icon will simply call an existing mobile device browser application with a new URL. The application is placed in the service book database and marked accepted, not pending 384.

Figure 13:
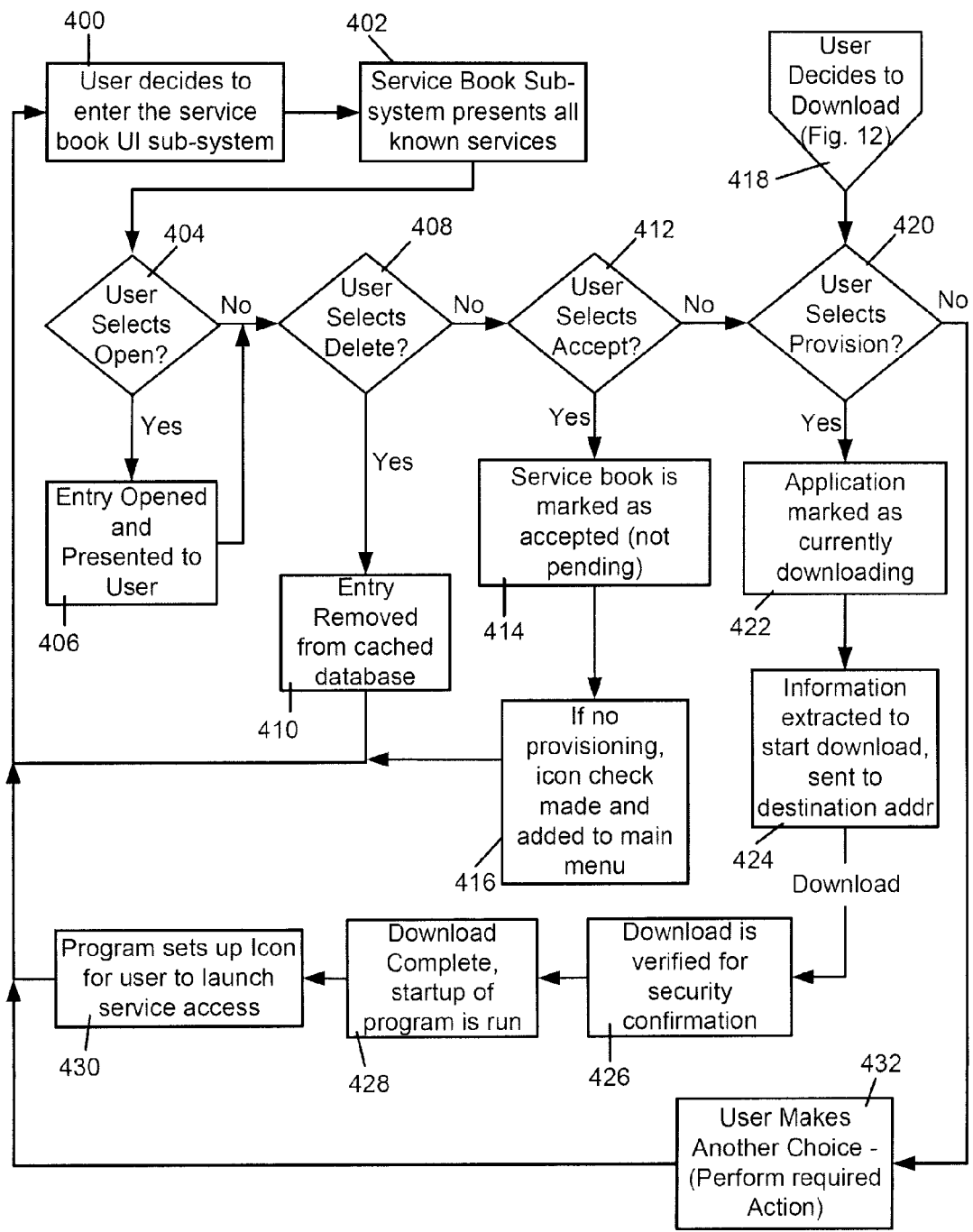
FIG. 13 represents a flow diagram for how the user interacts with the service book sub-system on a handheld device.

If the user has decided to accept and provision the application 380 they are taken to a step within the data flow shown in FIG. 13. Performing the provisioning step from the dialog box automatically performs an accept, followed by any provisioning steps that might be required. In this example the provisioning steps shown will include downloading an application for the host service and collecting credit-checking information from the user.

Turning now to FIG. 13 this represents a flow diagram for how the user interacts with the service book sub-system on a handheld device. The first step in the data flow is when the user decides to enter the service book sub-system 400. The service book sub-system presents all known and pending services to the user and presents them with a friendly UI to select menu choices and options 402. The choices in this sub-system can be very extensive. It should be understood, however, that the options described in this data flow are representative of the most commonly used methods for manipulating database entries that have characteristics similar to service book entries.

If the user selects to 'open' the service book 404, the current service book entry is opened and a new dialog box or screen is presented to the user 406. This opened service book may be more extensive then the one shown when the entry first arrived, and the user would be able to scroll or move through all fields of the service book. While in this screen the user could perform the same actions as shown, including deleting, accepting and provisioning. If the user decides they don't want the service book entry on the device any longer, they can select to delete the service book 408. In this case the service book entry is removed from the database cache 410 and the software returns to the service book main menu, where the user can exit the service book sub-system if they want.

If the user doesn't delete the entry they might decide to accept a pending entry 412. In this case the service book is marked as accepted, not pending 414. If no provisioning is present, any provided icon information is placed on the main menu with invocation instructions for the correct application 416. The software then returns to wait for more user input or to exit the service book sub-system. If the user has already accepted, or if they want to both accept and provision a pending service book, they can select the provision menu item 420. This path can also be entered if the user decides to provision directly from the original service book notification dialog box 418. In this case the service book is marked as accepted, if it was pending, and the entry is marked as download in progress 422. Any necessary information to start the download is extracted and sent to the specified download address to start the process 424. The download then takes place, which may or may not been seen by the user. This activity could be a background activity, or the user might be given the option of watching a progress bar.

Once the application has been download the security for the application is checked. This could be done using a signature technique, where one or more parties that have a stake in its quality have signed the application. These stakeholders represent an implied quality or trust level that may also be presented to the user before the application is given any CPU cycles to perform initialization 426. If the user accepts the application, or if it was an automatic download and run application, the application performs its initialization 428. Initialization might reserve resources, perform database setup and initialization and could set an icon on the main menu for the user 430.

The user could also have selected a range of other commands in the service book sub-system 432. One such command could sort entries into pending and not pending, or wireless and serial entries. Another command could create sub-views, or sorted views of the services to create a hierarchical view. There could also be commands that could perform 'ping' tests to the host service to ensure the host service is still on-line. There could also be options to change the main service book listing view. Perhaps the user decides to see the time the service book entry was received, or the service name, or the service type, or the description string, there are a large number of options available to them. Once these commands are performed the user will return and enter other commands until they exit the service book sub-system.

Figure 14:
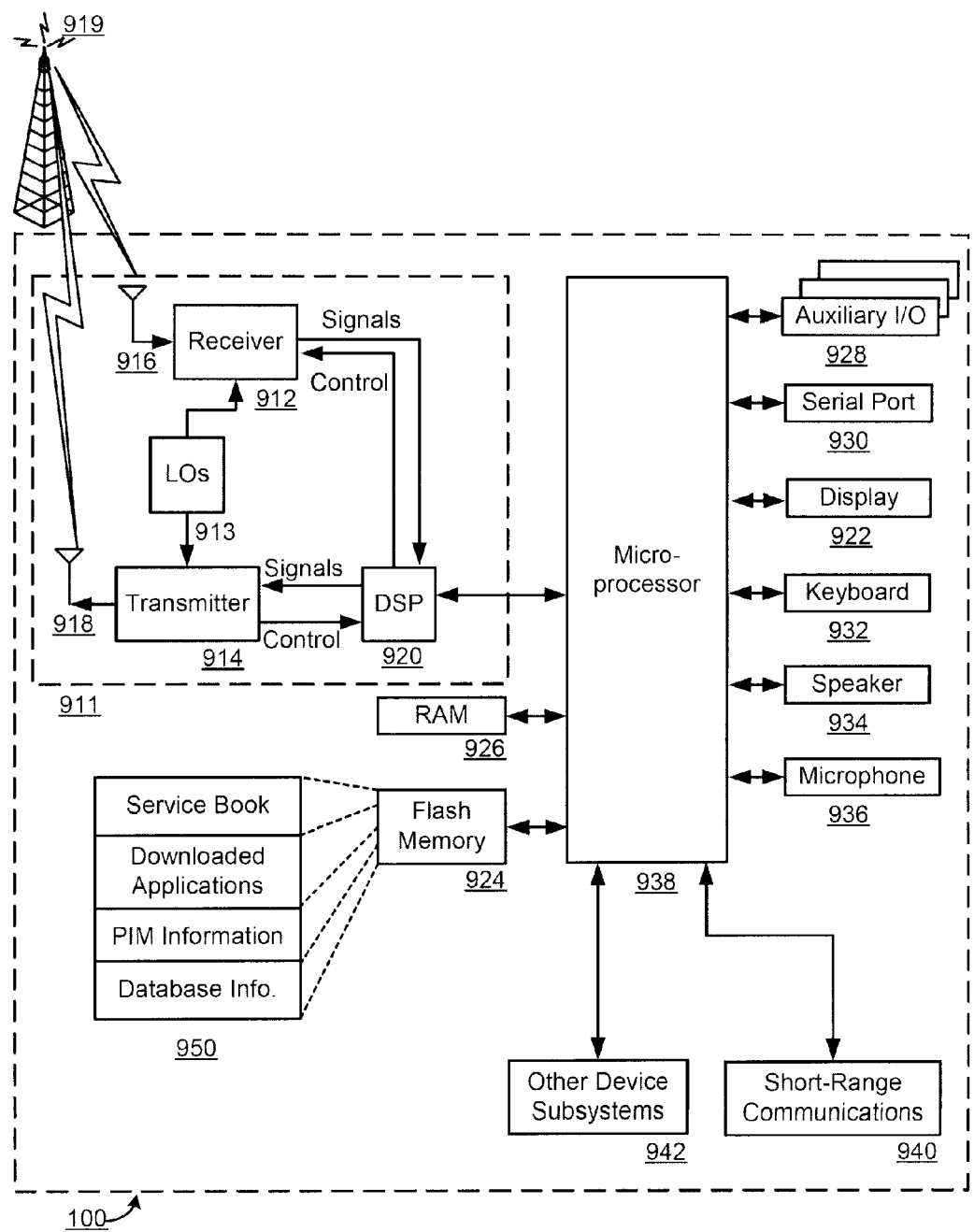
FIG. 14 is a block diagram of a mobile communication device 100 in which the dynamic expansion of host services may be implemented.

Turning now to FIG. 14 there is a block diagram of a mobile communication device 100 in which the dynamic expansion of host services may be implemented. The mobile communication device 100 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 100 is enabled for two-way communications, the device will incorporate a communication subsystem 911, including a receiver 912, a transmitter 914, and associated components such as one or more, preferably embedded or internal, antenna elements 916 and 918, local oscillators (LOs) 913, and a processing module such as a digital signal processor (DSP) 920. It should be understood, however, that the particular design of the communication subsystem 911 is dependent upon the communication network in which the device is intended to operate. For example, a mobile device 100 destined for a North American market may include a communication subsystem 911 designed to operate within the Mobitex™ mobile communication system or DataTAC™ mobile communication system, whereas a mobile device 100 intended for use in Europe may incorporate a General Packet Radio Service (GPRS) communication subsystem 911.

Network access requirements will also vary depending upon the type of network 919. For example, in the Mobitex and DataTAC networks, mobile devices such as 100 are registered on the network using a unique personal identification number or PIN associated with each device. In GPRS networks however, network access is associated with a subscriber or user of a device 100. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the mobile device 100 will be unable to carry out any functions involving communications over network 919. When required network registration or activation procedures have been completed, a mobile device 100 may send and receive communication signals over the network 919. Signals received by the antenna 916 through a communication network 919 are input to the receiver 912, which may perform such common receiver functions as signal amplification, frequency down conversion, filtering, channel selection and the like, and in the example system shown in FIG. 9, analog to digital conversion. Analog to digital conversion of a received signal allows more complex communication functions such as demodulation and decoding to be performed in the DSP 920. In a similar manner, signals to be transmitted are processed, including modulation and encoding for example, by the DSP 920 and input to the transmitter 914 for digital to analog conversion, frequency up conversion, filtering, amplification and transmission over the communication network 919 via the antenna 918.

The DSP 920 not only processes communication signals, but also provides for receiver and transmitter control. For example, the gains applied to communication signals in the receiver 912 and transmitter 914 may be adaptively controlled through automatic gain control algorithms implemented in the DSP 920.

The mobile device 100 preferably includes a microprocessor 938 which controls the overall operation of the device. Communication functions, including at least data and voice communications, are performed through the communication subsystem 911. The microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 11 perform communication-related functions, whereas other subsystems may provide "resident" or on-device functions. Notably, some subsystems, such as keyboard 932 and display 922 for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read only memory (ROM) or similar storage element (not shown). The operating system, specific device applications, or parts thereof, may be temporarily loaded into a volatile store such as RAM 926. It is contemplated that received communication signals may also be stored to RAM 926. In this application the flash memory 924 of the mobile device 100 also hold downloaded applications, such as Java (J2ME-based) applications downloaded 950 over the serial port, or over-the-air. The flash memory 924 also holds all known service books 950, pending or accepted. If the mobile device 100 should reset, or experience a failure these entries will not be lost and the user can still accept pending entries at any time 950. Within the flash memory 924 on the mobile device 100 is also other PIM and databases used for configuring and operating the software components of the system.

The microprocessor 938, in addition to its operating system functions, preferably enables execution of software applications on the device. A predetermined set of applications that control basic device operations, including at least data and voice communication applications for example, will normally be installed on the mobile device 100 during manufacture. A preferred application that may be loaded onto the device may be a personal information manager (PIM) application having the ability to organize and manage data items relating to the device user such as, but not limited to e-mail, calendar events, voice mails, appointments, and task items. One or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system. Further applications may also be loaded onto the mobile device 100 through the network 919, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile device 100.

In a data communication mode, a received signal such as a text message or web page download will be processed by the communication subsystem 911 and input to the microprocessor 938, which will preferably further process the received signal for output to the display 922, or alternatively to an auxiliary I/O device 928. A user of mobile device 100 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of the mobile device 100 is substantially similar, except that received signals would preferably be output to a speaker 934 and signals for transmission would be generated by a microphone 936. Alternative voice or audio I/O subsystems such as a voice message recording subsystem may also be implemented oil the mobile device 100. Although voice or audio signal output is preferably accomplished primarily through the speaker 934, the display 922 may also be used to provide an indication of the identity of a calling party, the duration of a voice call, or other voice call related information for example.

The serial port 930 in FIG. 11 would normally be implemented in a personal digital assistant (PDA)-type communication device for which synchronization with a user's desktop computer (not shown) may be desirable, but is an optional device component. Such a port 930 would enable a user to set preferences through an external device or software application and would extend the capabilities of the device by providing for information or software downloads to the mobile device 100 other than through a wireless communication network. The alternate download path may for example be used to load an encryption key onto the device through a direct and thus reliable and trusted connection to thereby enable secure device communication.

A short-range communications subsystem 940 is a further optional component which may provide for communication between the device 924 and different systems or devices, which need not necessarily be similar devices. For example, the subsystem 940 may include an infrared device and associated circuits and components or a Bluetooth™ communication module to provide for communication with similarly-enabled systems and devices.

This written description uses examples to disclose the invention, including the best mode and also to enable any person skilled in the art to make and use the invention. The patentable scope of the invention is defined by the claims, and may include other examples that occur to those skilled in the art.

It is claimed:

1. A mobile device, comprising:
    a processor; a service book application stored in a memory store and executable by the processor to:
    (i) receive a pushed service book at the mobile device over a wireless network from a service registry, the service book including a plurality of fields relating to a host service and identifying a service provided by the host service, wherein the service registry is a central registry that is accessible on a wired computer network;
    the service book application being further executable by the processor to
    (ii) receive an indication from a user of acceptance of the service provided by the host service, and,
    (iii) in response to receiving the acceptance, download from the service registry, to the mobile device that received the pushed service book, an internet application that prompts the user for information needed to initiate the service on the host service; and
    performing the steps (i) through (iii) for each of at least two service books; and
    a service book subsystem configured to display a list of the at least two service books;
    wherein the host service that provides the service and the service registry that pushes the service book and downloads the application are separate entities at different network locations.

2. The mobile device of claim 1, wherein the service book is received from the service registry using an electronic mail address associated with the mobile device.

3. The mobile device of claim 1, wherein the service book is received from the service registry using an identification number for the mobile device in the wireless network.

4. The mobile device of claim 1, wherein the service book includes wireless propagation information for transmitting the service book over the wireless network.

5. The mobile device of claim 4, wherein the service book is transmitted to the service registry from the host service via a computer network, and wherein the service registry uses the wireless propagation information to transmit the service book over the wireless network.

6. The mobile device of claim 1, wherein the service book is transmitted from the service registry to the mobile device via a close proximity link.

7. The mobile device of claim 6, wherein the close proximity link is one of an infrared transmission system, a serial link, a spread spectrum wireless transmission system and a radio frequency transmission system.

8. A method of provisioning a service on a mobile device, comprising:
    (i) receiving on the mobile device a pushed service book over a wireless network from a service registry, the service book including a plurality of fields relating to a host service and including an offer to perform the service, wherein the service registry is a central registry that is accessible on a wired computer network;
    (ii) receiving from the mobile device an indication from a user of acceptance of the service; and
    (iii) in response to receiving the acceptance, the mobile device downloading from the service registry, to the mobile device that received the pushed service book, an internet application that prompts the user for information to initiate the service at the host service; and
    (iv) performing the steps (i) through (iii) for each of at least two service books; and
    (v) displaying a list of the at least two service books;
    wherein the host service that provides the service and the service registry that pushes the service book and downloads the application are separate entities at different network locations.

9. The method of claim 8, wherein the service book is received from the service registry using an electronic mail address associated with the mobile device.

10. The method of claim 8, wherein the service book is received from the service registry using an identification number for the mobile device in the wireless network.

11. The method of claim 8, wherein the service book includes wireless propagation information for transmitting the service book over the wireless network.

12. The method of claim 11, wherein the service book is transmitted to the service registry from the host service via a computer network, and wherein the service registry uses the wireless propagation information to transmit the service book over the wireless network.

13. The method of claim 8, wherein the service book is transmitted from the service registry to the mobile device via a close proximity link.

14. The method of claim 13, wherein the close proximity link is one of an infrared transmission system, a serial link, a spread spectrum wireless transmission system and a radio frequency transmission system.

15. The method of claim 8 wherein the application installs an icon on a main menu of the mobile device that is used to launch the downloaded application.

16. The method of claim 8 wherein the application is a Java application.

17. The method of claim 8 wherein the application communicates with sub-systems on the mobile device to determine one or more of the mobile device's type, capabilities, CPU speed, memory size, network type, screen size, and input methods, and sends this information to the host service.

18. The method of claim 8 wherein the application checks that the correct service book is present on the mobile device.

19. The method of claim 8 wherein the mobile device displays a list of all currently held service books, with an indication of how each service book came to arrive to the mobile device.

* * * * *